(12) United States Patent
Suzuki et al.

(10) Patent No.: US 12,332,972 B2
(45) Date of Patent: Jun. 17, 2025

(54) GENERATION SYSTEM, COMPUTER-READABLE STORAGE MEDIUM, AND METHOD FOR GENERATING WAVEFORM EVALUATION MODEL

(71) Applicant: KABUSHIKI KAISHA YASKAWA DENKI, Kitakyushu (JP)

(72) Inventors: Ryohei Suzuki, Tokyo (JP); Ryo Kabutan, Fukuoka (JP); Takuya Kadoya, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 18/496,912

(22) Filed: Oct. 29, 2023

(65) Prior Publication Data

US 2024/0144101 A1      May 2, 2024

Related U.S. Application Data

(60) Provisional application No. 63/421,539, filed on Nov. 1, 2022.

(30) Foreign Application Priority Data

Mar. 2, 2023   (JP) ................................ 2023-032308

(51) Int. Cl.
    *G06F 18/214*    (2023.01)
    *G06N 20/00*     (2019.01)

(52) U.S. Cl.
    CPC ......... *G06F 18/2148* (2023.01); *G06N 20/00* (2019.01); *G06F 18/214* (2023.01)

(58) Field of Classification Search
    CPC .... G06F 18/2148; G06F 18/214; G06N 20/00
    See application file for complete search history.

(56) References Cited

U.S. PATENT DOCUMENTS

2018/0189607 A1*  7/2018  Cocias ................. G06F 18/214
2020/0116522 A1   4/2020  Paul
(Continued)

FOREIGN PATENT DOCUMENTS

CN    112240964 A      1/2021
CN    114966845 A  *   8/2022
(Continued)

OTHER PUBLICATIONS

Wang et al., "SeismoGen: Seismic Waveform Synthesis Using GAN With Application to Seismic Data Augmentation" Journal of Geophysical Research: Solid Earth, 126, 2021 (Year: 2021).*

(Continued)

*Primary Examiner* — John C Kuan

(57) ABSTRACT

Provided is a generation system including: one or more processors which acquire waveform data; specify an intention of a user; and generate pseudo waveform data from the waveform data acquired in such a manner that an intention of a user specified is reflected. Provided is a method for generating a waveform evaluation model executed by a computer, including: acquiring waveform data; specifying an intention of a user; generating pseudo waveform by generating pseudo waveform data from the waveform data acquired in the acquiring the waveform data in such a manner that the intention of the user specified in the specifying the intention is reflected; and executing learning by executing machine learning using the pseudo waveform data generated in the generating the pseudo waveform to generate a waveform evaluation model which outputs an evaluation result of input waveform data.

15 Claims, 12 Drawing Sheets

(56) References Cited

U.S. PATENT DOCUMENTS

| | | | |
|---|---|---|---|
| 2021/0263839 A1 | 8/2021 | Kim | |
| 2021/0287654 A1* | 9/2021 | Sharma | G06N 5/02 |
| 2022/0005482 A1* | 1/2022 | Yamamoto | G10L 21/04 |
| 2022/0065705 A1 | 3/2022 | Furukawa | |
| 2022/0139117 A1* | 5/2022 | Zhang | G06N 3/08 |
| | | | 701/29.4 |

FOREIGN PATENT DOCUMENTS

| | | | | |
|---|---|---|---|---|
| JP | 2020064367 A | | 4/2020 | |
| JP | 202115445 A | | 2/2021 | |
| JP | 7015405 B1 | * | 2/2022 | G06N 20/00 |
| JP | 2022038659 A | | 3/2022 | |
| KR | 102086351 B1 | * | 5/2020 | |
| WO | WO-2020045335 A1 | * | 3/2020 | |
| WO | WO-2022196293 A1 | * | 9/2022 | G06N 20/00 |

OTHER PUBLICATIONS

Maguolo et al., "Audiogmenter: a MATLAB toolbox for audio data augmentation" Applied Computing and Informatics, 2021 (Year: 2021).*

Zhengli Zhao et al., "Image Augmentations for GAN Training.",https://arxiv.org/abs/2006.02595,Jun. 4, 2020.

Brian Kenji Iwana et al.,"An empirical survey of data augmentation for time series classification with neural networks", PLoS ONE 16(7): e0254841, https://journals.plos.org/plosone/article?id=10.1371/journal.pone.0254841, Jul. 15, 2021.

Office Action issued for counterpart Japanese Application No. 2023-032308, transmitted from the Japanese Patent Office on May 21, 2024 (drafted on May 13, 2024).

* cited by examiner

220

DATA SET SELECTION

PSEUDO WAVEFORM LIST    NUMBER OF PIECES OF DATA: ○○    [SELECT ALL] [DESELECT ALL]

[ZOOM RESET]

FILE NAME
- train_normal_000000.csv
- train_normal_000001.csv
- train_normal_000002.csv
- train_normal_000003.csv
- train_normal_000004.csv
- train_normal_000005.csv

DESIGNATE SECTION IN HISTOGRAM

SELECTION    NOT USE

CLASS WIDTH: [SETTING]    [ZOOM RESET]    LOWER LIMIT: [ ]    UPPER LIMIT: [ ]

COMMENT [ ]

[REGISTER DATA SET]    [EXPORT DATA SET]    [CLOSE]

FIG.4

| PROJECT | DATA SET | NUMBER OF PIECES OF DATA | ORIGINAL WAVEFORM | PREPROCESSING | RECIPE |
|---|---|---|---|---|---|
| PSEUDO WAVEFORM OF BALL SCREW | ABNORMALITY DATA A OF BALL SCREW | 80 | RAW ABNORMALITY DATA A | — | NOISE ADDITION PROCESSING STANDARD DEVIATION : 0.0002 |
| | ABNORMALITY DATA B OF BALL SCREW | 80 | RAW ABNORMALITY DATA A | DOWN-SAMPLING SAMPLING RATE : 6 | EXPANSION/CONTRACTION PROCESSING warp_scales: 0.5, 2.0 window_ratio: 0.1 |
| | ... | | | ... | ... |

GENERATION SYSTEM, COMPUTER-READABLE STORAGE MEDIUM, AND METHOD FOR GENERATING WAVEFORM EVALUATION MODEL

The contents of the following patent application(s) are incorporated herein by reference:
NO. 63/421,539 filed in US on Nov. 1, 2022 NO. 2023-032308 filed in JP on Mar. 2, 2023

BACKGROUND

1. Technical Field

The present invention relates to a generation system, a computer-readable storage medium, and a method for generating a waveform evaluation model.

2. Related Art

Non-Patent Document 1 and Non-Patent Document 2 describe a technique, which is called data extension, for generating new data from existing data.

CITATION LIST

Non-Patent Document

Non-Patent Document 1: Zhao, Zhengli, Zizhao, Zhang, Ting, Chen, Sameer, Singh, and Han, Zhang. "Image Augmentations for GAN Training." (2020)

Non-Patent Document 2: Brian Kenji Iwana, and Seiichi Uchida. "An empirical survey of data augmentation for time series classification with neural networks". PLOS ONE 16, no. 7 (2021): e0254841

BRIEF DESCRIPTION OF THE DRAWINGS

FIG. 4 illustrates an example of the display regarding the pseudo waveform confirmation processing.

FIG. 7 schematically illustrates an example of management data 190.

DESCRIPTION OF EXEMPLARY EMBODIMENTS

Hereinafter, embodiments of the present invention will be described. However, the following embodiments are not for limiting the invention according to the claims. In addition, not all combination of the features described in the embodiments are necessary for the solution of the invention.

Figure 1:
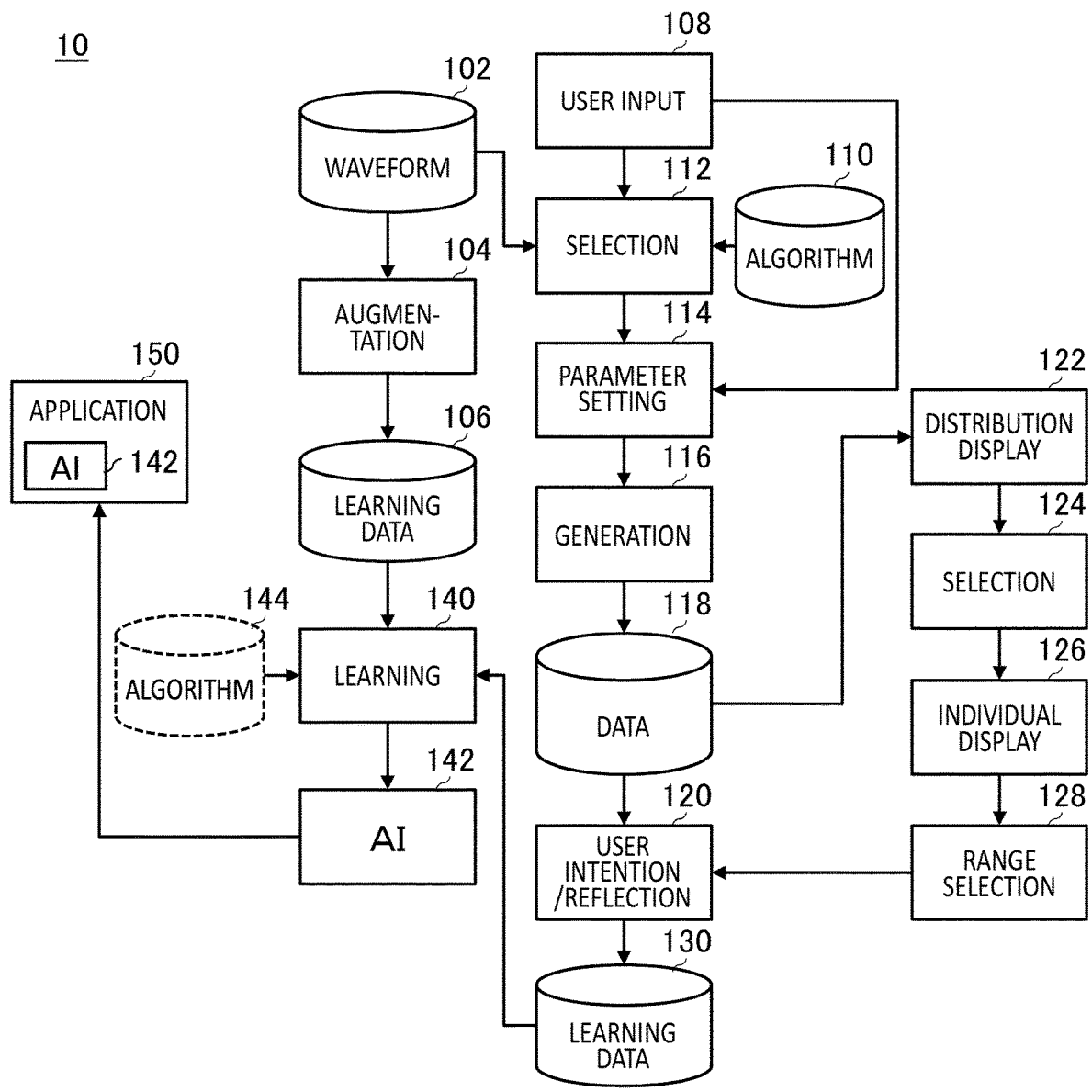
FIG. 1 illustrates an explanatory diagram for explaining processing in a system 10.

FIG. 1 illustrates an explanatory diagram for explaining processing in a system 10. The system 10 may be implemented by one apparatus. The system 10 may be implemented by a plurality of apparatuses. The system 10 may be an example of a generation system.

The system 10 generates a pseudo waveform from an existing waveform. For example, the system 10 has a function of generating a pseudo abnormal waveform, thereby enabling learning of AI even with a small amount of abnormality data. The system 10 has a pseudo abnormal waveform generation function of generating and outputting a pseudo abnormal waveform. The system 10 may have a discriminator learning function of learning a discriminator by using a pseudo abnormal waveform.

For example, in many cases, abnormality data cannot be not sufficiently measured in a process before startup. Under this situation, even if a model of AI is generated to realize automation (determine normality and abnormality automatically) in an inspection process, sufficient performance is not obtained in many cases. This is because it is easy to overfit with a small amount of abnormality data and the accuracy of determination cannot be sufficiently obtained.

On the other hand, the system 10 processes the abnormal waveform so as not to greatly impair the physical meaning, and generates the abnormal waveform as a pseudo abnormal waveform. The system 10 generates a large amount of variously processed pseudo abnormal waveforms from a small amount of abnormal waveforms.

For example, in a product manufacturing system, there are many situations where it is desired to inspect whether there is a defect in a manufactured product, but the number of pieces of abnormality data is small since a manufacturing process has just started. In order to accurately determine normality and abnormality, a certain number of pieces of abnormality data is required, but when the collection is continued up to the required number, in a manufacturing process in which a process capacity is set to 3a (a possibility of deviating from the standard is about 0.3%), abnormality data appear in 3 out of 1000 pieces, and 33000 products need to be manufactured when 100 pieces of abnormality data are to be collected. In this case, it takes time to start AI for inspection.

According to the system 10 according to the present embodiment, it is possible to generate an AI discriminator with sufficient accuracy by generating a large amount of pseudo abnormality data at a stage where a small amount of abnormality data has been collected, and it is possible to contribute to startup of an automatic inspection process at an early stage.

The system 10 is not limited to the abnormal waveform, and may generate the pseudo normal waveform from a normal waveform. The system 10 is not limited to the abnormal waveform and the normal waveform, and may generate the pseudo waveform from an arbitrary waveform.

For example, the system 10 processes a fixed length of waveform data periodically acquired by a motor or the like that performs a repetitive operation. For example, the system 10 processes data in which a waveform has periodicity and a feature appears after conversion into a frequency domain.

The system 10 includes a waveform storage unit 102. The waveform storage unit 102 stores waveform data which is a source of generating pseudo waveform data. The waveform data may be time-series data. For example, the waveform storage unit 102 stores the waveform data generated by observing or measuring a target system.

The waveform storage unit 102 may store the abnormal waveform data generated by observing or measuring the target system in a state where an abnormality occurs in the target system itself. For example, the waveform storage unit 102 may store the abnormal waveform data generated by observing or measuring the target system in a state where an abnormality is intentionally caused to occur in the target system. In a case where the target system is a system that manufactures a product, the waveform storage unit 102 may store the abnormal waveform data generated by observing or measuring the target system when an abnormality occurs in a product, and the abnormal waveform data generated by observing or measuring the product.

The waveform storage unit 102 may store normal waveform data used to generate AI for discriminating between a normal waveform and an abnormal waveform. The waveform storage unit 102 may store the normal waveform data generated by observing or measuring the target system while the target system is operating normally. In a case where the target system is a system that manufactures a product, the waveform storage unit 102 may store the normal waveform data generated by observing or measuring the target system when a product is normal, and the normal waveform data generated by observing or measuring the product.

The waveform storage unit 102 may store arbitrary waveform data regardless of the normal waveform data and the abnormal waveform data.

The system 10 may execute augmentation processing 104 on the waveform data stored in the waveform storage unit 102. The augmentation processing 104 may be executed by the pseudo waveform generation unit included in the system 10.

Figure 2:
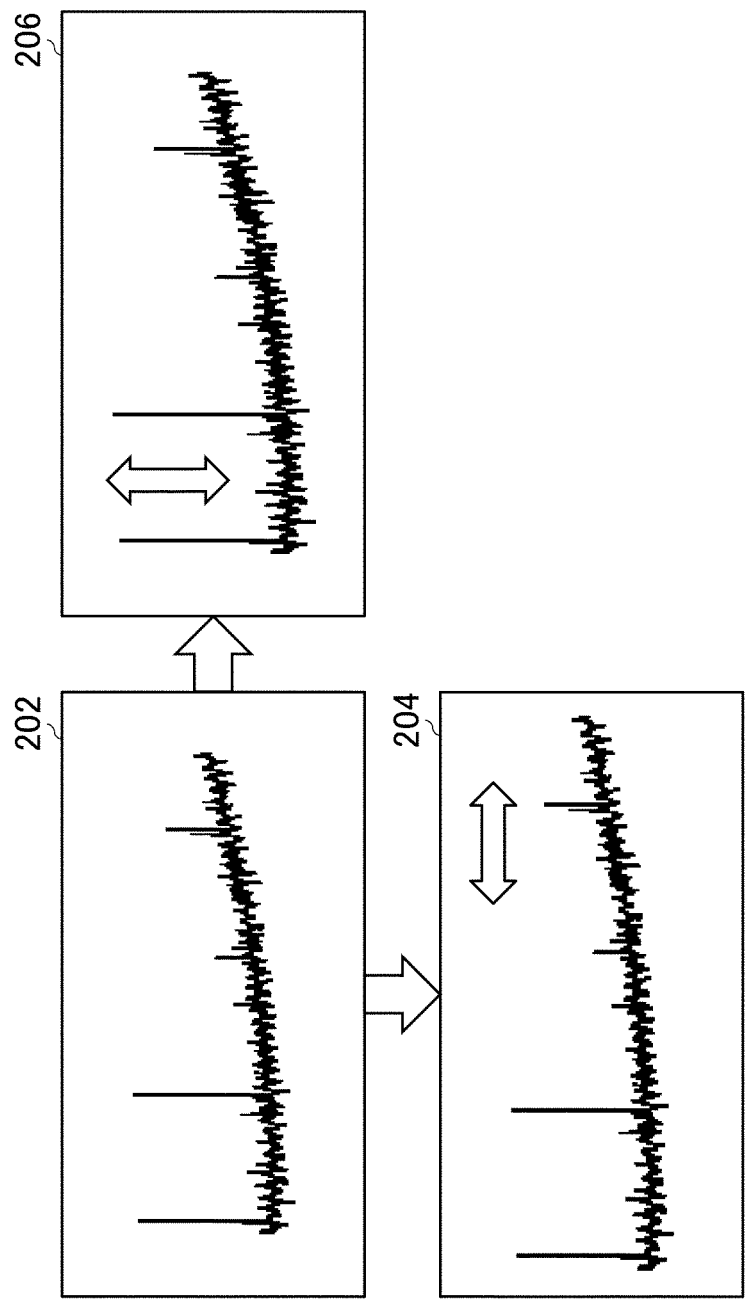
FIG. 2 illustrates an example of pseudo abnormal waveform data.

For example, a pseudo waveform generation unit generates various types of pseudo abnormal waveform data in a pseudo manner from the abnormal waveform data stored in the waveform storage unit 102. The pseudo waveform generation unit generates the pseudo abnormal waveform data by, for example, adding noise to the abnormal waveform data, expanding the abnormal waveform data in a graph vertical axis direction, contracting the abnormal waveform data in the graph vertical axis direction, expanding the abnormal waveform data in a graph horizontal axis direction, or contracting the abnormal waveform data in the graph horizontal axis direction. As a specific example, as illustrated in FIG. 2, the pseudo waveform generation unit generates the pseudo abnormal waveform data 204 by expanding abnormal waveform data 202 in the graph horizontal axis direction and generates pseudo abnormal waveform data 206 by expanding the abnormal waveform data 202 in the graph vertical axis direction.

As a specific example, the pseudo waveform generation unit generates about 100 pieces of pseudo abnormal waveform data from about 10 pieces of abnormal waveform data.

Similarly, the pseudo waveform generation unit may generate various types of pseudo normal waveform data in a pseudo manner from the normal waveform data. Similarly, the pseudo waveform generation unit may generate various types of pseudo waveform data in a pseudo manner from arbitrary waveform data.

A learning data storage unit 106 stores learning data for learning AI for discriminating between the normal waveform and the abnormal waveform. The learning data storage unit 106 may store, as learning data, the waveform data stored in the waveform storage unit 102 and the pseudo waveform data generated by the pseudo waveform generation unit. For example, the learning data storage unit 106 stores the normal waveform data and a small amount of abnormal waveform data stored in the waveform storage unit 102, and the pseudo abnormal waveform data generated from the small amount of abnormal waveform data by the pseudo waveform generation unit.

The system 10 may include an input reception unit that receives a user input 108 by a user of the system 10. In addition, the system 10 may include an algorithm storage unit 110 that stores a plurality of algorithms for generating pseudo waveform data from the original waveform data.

The pseudo waveform generation unit may execute selection processing 112 of selecting one or more algorithms from the plurality of algorithms stored in the algorithm storage unit 110 according to the user input 108 received by the input reception unit.

The pseudo waveform generation unit may execute parameter setting processing 114 for setting a parameter for generating the pseudo waveform data. For example, the pseudo waveform generation unit may set a plurality of parameters such as a large parameter amplitude, a medium parameter amplitude, and a small parameter amplitude for one algorithm. The pseudo waveform generation unit may execute the parameter setting processing 114 according to the user input 108 received by the input reception unit. The pseudo waveform generation unit may automatically execute the parameter setting processing 114. The pseudo waveform generation unit executes the parameter setting processing 114 on the basis of, for example, a difference between the normal waveform data and the abnormal waveform data.

The pseudo waveform generation unit executes generation processing 116 of generating pseudo waveform data by applying the parameter set by the parameter setting processing 114 to the algorithm selected by the selection processing 112. For example, the pseudo waveform generation unit generates the pseudo waveform data by sequentially applying the plurality of parameters set in the parameter setting processing 114 to one algorithm selected in the selection processing 112. For example, the pseudo waveform generation unit generates, for a noise-adding algorithm, the pseudo waveform data by setting a parameter with a large amplitude, generates the pseudo waveform data by setting a parameter with a medium amplitude, and generates the pseudo waveform data by setting a parameter with a small amplitude. The pseudo waveform generation unit stores the generated pseudo waveform data in a data storage unit 118.

As a specific example, the pseudo waveform generation unit generates the pseudo waveform data by adding a random numerical value based on a normal distribution having an average of 0 and a standard deviation a with respect to the waveform data. In addition, as a specific example, the pseudo waveform generation unit generates the pseudo waveform data by integrating a random numerical value based on a normal distribution having an average of 1 and the standard deviation a with respect to the waveform data. The pseudo waveform generation unit may set the standard deviation a by the parameter setting processing 114. For example, the pseudo waveform generation unit sets one or more standard deviations a in accordance with a user instruction. When generating the pseudo abnormal waveform data, the pseudo waveform generation unit sets the standard deviation a on the basis of, for example, a difference between the normal waveform data and the abnormal waveform data. For example, the pseudo waveform generation unit increases the standard deviation a as the difference between the normal waveform data and the abnormal waveform data increases.

The system 10 may use, as the learning data, all of the pseudo waveform data stored in the data storage unit 118, or may use, as the learning data, only a part of the pseudo waveform data stored in the data storage unit 118 according to the intention of the user of the system 10.

The system 10 may include a pseudo waveform confirmation processing unit. The pseudo waveform confirmation processing unit executes user intention/reflection processing 120 on the pseudo waveform data stored in the data storage unit 118.

The pseudo waveform confirmation processing unit may execute distribution display processing 122 for displaying, to the user, a distribution representing the feature of the generated pseudo waveform data for each combination of the algorithm and the parameter setting. For example, the pseudo waveform confirmation processing unit displays, to the user, a histogram or a graph visually displaying how much variation the pseudo waveform data for each combination of the algorithm and the parameter setting is generated to have with respect to the waveform data which is a source of generating the pseudo waveform data. As a specific example, the pseudo waveform confirmation processing unit displays, for one algorithm, a histogram indicating a correlation between a plurality of pieces of pseudo waveform data generated by setting a first parameter and the original waveform data, a histogram indicating a correlation between a plurality of pieces of pseudo waveform data generated by setting a second parameter and the original waveform data, and a histogram indicating a correlation between a plurality of pieces of pseudo waveform data generated by setting a third parameter and the original waveform data together. Similarly for another algorithm, the pseudo waveform confirmation processing unit may display a histogram of a plurality of pieces of pseudo waveform data generated by setting each of the plurality of parameters. By browsing the display, the user can examine which one is to be adopted among the combinations of the plurality of algorithms and the parameter settings.

For example, the pseudo waveform confirmation processing unit displays, to the user, a histogram or a graph visually displaying the variation of the pseudo abnormal waveform data for each combination of the algorithm and the parameter setting with respect to the abnormal waveform data which is a source of generating the pseudo abnormal waveform data. The pseudo waveform confirmation processing unit may display the average waveform of the abnormal waveform data and the average waveform of the pseudo abnormal waveform data for each combination of the algorithm and the parameter setting together. The pseudo waveform confirmation processing unit may display, to the user, a histogram or a graph indicating a statistical difference between the abnormal waveform data and the pseudo abnormal waveform data for each combination of the algorithm and the parameter setting from various viewpoints.

Figure 3:
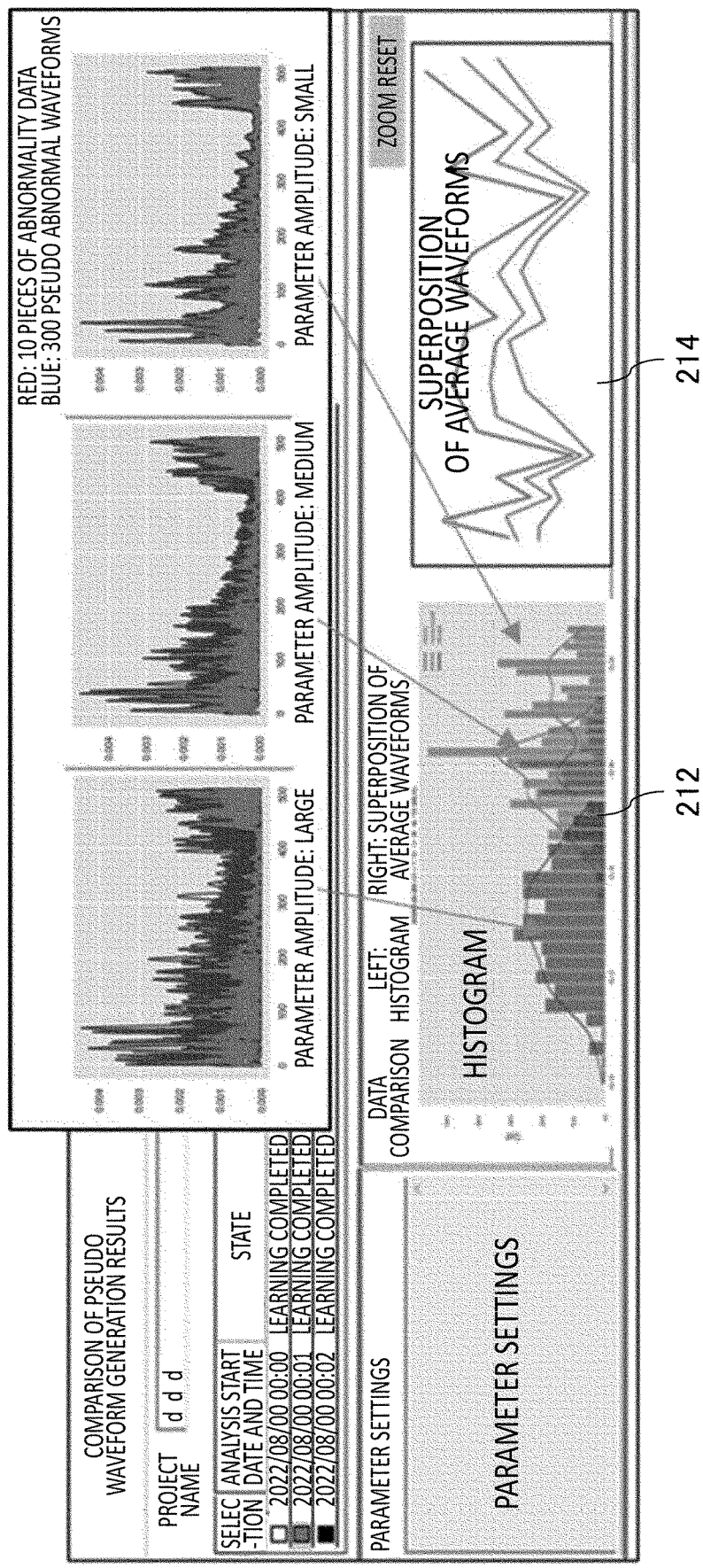
FIG. 3 illustrates an example of display regarding pseudo waveform confirmation processing.

For example, the pseudo waveform confirmation processing unit may display, to the user, a histogram or a graph visually displaying the variation of the abnormal waveform data and the pseudo abnormal waveform data for each combination of the algorithm and the parameter setting with respect to the normal waveform data. The pseudo waveform confirmation processing unit may display the average waveform of the normal waveform data, the average waveform of the abnormal waveform data, and the average waveform of the pseudo abnormal waveform data for each combination of the algorithm and the parameter setting together. The pseudo waveform confirmation processing unit may display, to the user, a histogram or a graph indicating a statistical difference between the normal waveform data, and the abnormal waveform data and the pseudo abnormal waveform data for each combination of the algorithm and the parameter setting from various viewpoints. As a specific example, the pseudo waveform confirmation processing unit may display, to the user, a histogram 212 and a waveform 214 illustrated in FIG. 3.

The pseudo waveform confirmation processing unit may execute a selection processing 124 of selecting at least a part from the pseudo waveform data in which the distribution is displayed by the distribution display processing 122 in accordance with the instruction of the user. The pseudo waveform confirmation processing unit may execute individual display processing 126 of individually displaying the pseudo waveform data selected by the selection processing 124. By browsing the display, the user can individually confirm the pseudo waveform data, and can use the pseudo waveform data as a material for determining which one is to be adopted among the combinations of the plurality of algorithms and the parameter settings. As a specific example, the pseudo waveform confirmation processing unit may provide the user with a display 220 as illustrated in FIG. 4.

The pseudo waveform confirmation processing unit executes range selection processing 128 of selecting a range to be adopted in the distribution or a range not to be adopted in the distribution in accordance with the instruction of the user who has browsed the display by the distribution display processing 122 and the individual display processing 126. The pseudo waveform confirmation processing unit regards the selection result by the range selection processing 128 as the intention of the user, and reflects, as the learning data, the data of the range to be adopted. The pseudo waveform confirmation processing unit may store, in the learning data storage unit 130, the data of the range to be adopted.

The system 10 may include a learning execution unit 140 that generates an AI 142 for discriminating between the normal waveform and the abnormal waveform by machine learning. The learning execution unit 140 may generate the AI 142 by executing machine learning using the learning data stored in the learning data storage unit 106. The learning execution unit 140 may execute machine learning using the normal waveform data, the abnormal waveform data, and the pseudo abnormal waveform data stored in the learning data storage unit 106. The learning execution unit 140 may change the number of pieces of pseudo abnormal waveform data used for learning according to the instruction or the like of the user. The learning execution unit 140 may execute machine learning, in which the weight of the pseudo abnormal waveform data with respect to that of the abnormal waveform data is reduced, according to the instruction or the like of the user.

The learning execution unit 140 may generate the AI 142 by executing machine learning using the learning data stored in the learning data storage unit 130. The learning execution unit 140 may execute machine learning using the normal waveform data, the abnormal waveform data, and the pseudo abnormal waveform data stored in the learning data storage unit 106. The learning execution unit 140 may change the number of pieces of pseudo abnormal waveform data used for learning according to the instruction or the like of the user. The learning execution unit 140 may execute machine learning, in which the weight of the pseudo abnormal waveform data with respect to that of the abnormal waveform data is reduced, according to the instruction or the like of the user.

The system 10 may include an algorithm storage unit 144 that stores a plurality of learning algorithms. The learning execution unit 140 may learn the AI 142 by using any of the plurality of learning algorithms stored in the algorithm storage unit 144. For example, the learning execution unit 140 uses a learning algorithm corresponding to the algorithm used to generate the pseudo waveform data among the algorithms stored in the algorithm storage unit 110. For example, the learning execution unit 140 uses a learning algorithm corresponding to the parameter setting used to generate the pseudo waveform data. For example, the learning execution unit 140 uses a learning algorithm corresponding to the algorithm used to generate the pseudo waveform data among the algorithms stored in the algorithm storage unit 110 and the parameter setting used to generate the pseudo waveform data. The learning execution unit 140 may use a learning algorithm selected in accordance with an instruction from the user of the system 10.

An application 150 having the AI 142 is provided to, for example, an apparatus that executes discrimination processing of discriminating between the normal waveform and the abnormal waveform, and the apparatus executes abnormality detection of the target system by executing the application 150. The application 150 having the AI 142 may be provided to an apparatus for any other application such as an apparatus that executes failure prediction.

As described above, the system 10 may include a pseudo waveform generation unit that generates pseudo waveform data from waveform data. The pseudo waveform generation unit may generate the pseudo waveform data from the waveform data in such a manner that the intention of the user is reflected in the pseudo waveform data. The pseudo waveform generation unit may generate the pseudo waveform data from the waveform data by using an algorithm corresponding to the intention of the user among the plurality of algorithms. For example, the pseudo waveform generation unit generates the pseudo waveform data from the waveform data by using one or more algorithms selected by the user. The pseudo waveform generation unit may generate the pseudo waveform data from the waveform data in accordance with the parameter setting corresponding to the intention of the user. For example, the pseudo waveform generation unit generates the pseudo waveform data from the waveform data in accordance with one or more parameter settings selected by the user. The pseudo waveform generation unit may generate the pseudo abnormal waveform data from the abnormal waveform data. The pseudo waveform generation unit may process a small amount of abnormal waveform data so as not to greatly impair the physical meaning and generate a large amount of abnormal waveform data.

As described above, the system 10 may include the pseudo waveform confirmation processing unit. The pseudo waveform confirmation processing unit may display, to the user, the distribution representing the feature of the pseudo waveform data generated by the pseudo waveform generation unit for each combination of the algorithm and the parameter setting. For example, the pseudo waveform confirmation processing unit displays, to the user, a histogram or a graph visually displaying how much variation the pseudo waveform data for each combination of the algorithm and the parameter setting is generated to have with respect to the waveform data which is a source of generating the pseudo waveform data. The pseudo waveform confirmation processing unit may select, as the data used for learning, the pseudo waveform data corresponding to the range selected by the user from the histogram displayed to the user. The pseudo waveform confirmation processing unit may display the pseudo waveform data corresponding to the range selected by the user from the histogram displayed to the user and the original waveform data in a comparable manner one by one. The pseudo waveform confirmation processing unit may display the variation of the pseudo waveform data corresponding to the range selected by the user and the variation of the original waveform data side by side.

As described above, the system 10 may include the learning execution unit that executes machine learning using the pseudo waveform data generated by the pseudo waveform generation unit. The learning execution unit may generate the AI for discriminating between the normal waveform and the abnormal waveform by the machine learning using the normal waveform data, the abnormal waveform data, and the pseudo abnormal waveform data generated from the abnormal waveform data by the pseudo waveform generation unit.

Figure 5:
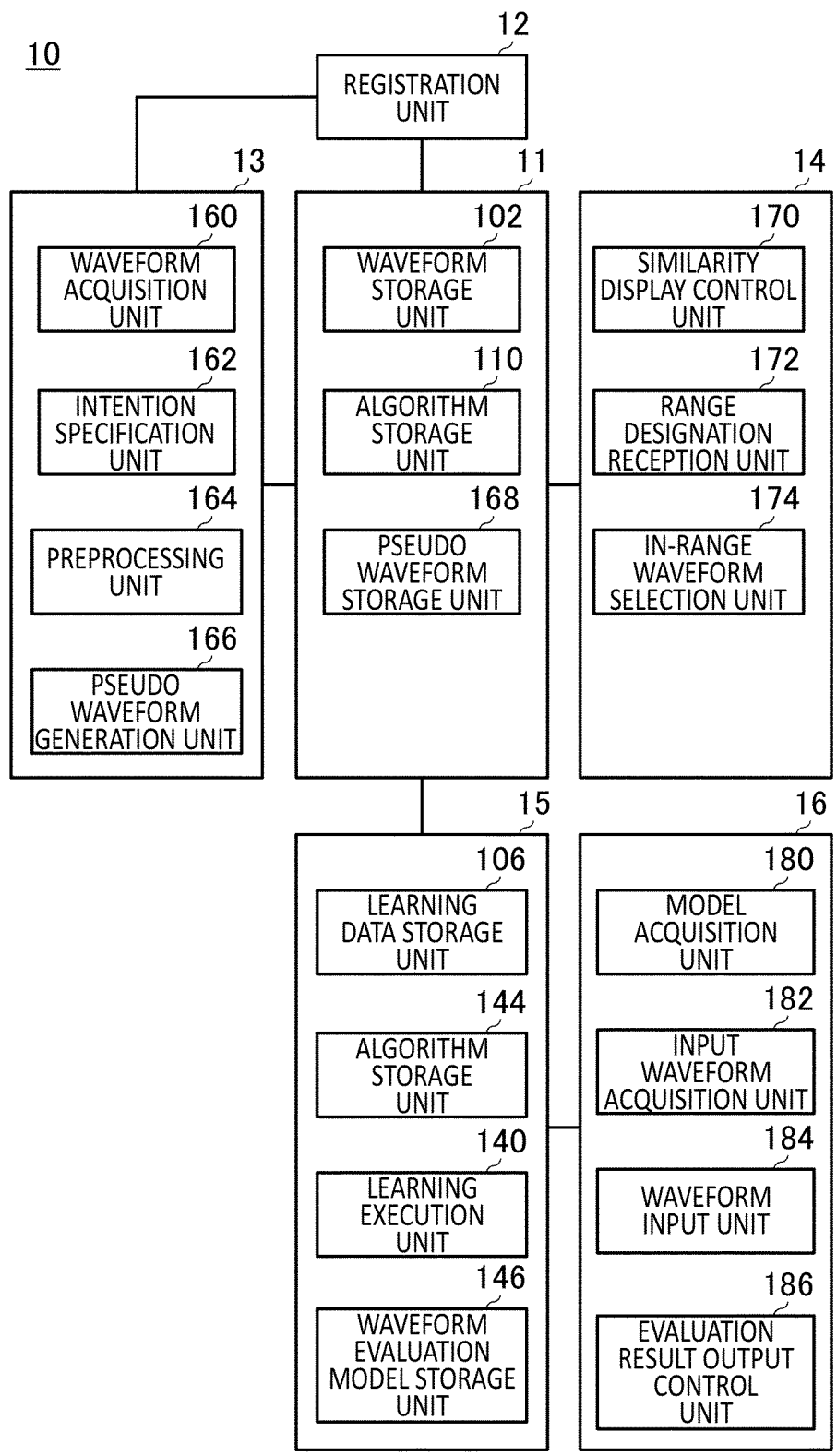
FIG. 5 schematically illustrates an example of a functional configuration of the system 10.

FIG. 5 schematically illustrates an example of a functional configuration of the system 10. The system 10 includes a storage unit 11, a registration unit 12, a generation unit 13, a pseudo waveform confirmation processing unit 14, a learning unit 15, and an evaluation execution unit 16. Note that it is not always necessary for the system 10 to include all of these.

The storage unit 11 may include the waveform storage unit 102, the algorithm storage unit 110, and a pseudo waveform storage unit 168. The waveform storage unit 102 stores waveform data. The waveform data may be time-series data. The waveform data may have any format. For example, the waveform data may be data expressed by continuous numerical values. The waveform storage unit 102 may store waveform data which is a source of generating pseudo waveform data. The waveform storage unit 102 may store evaluation waveform data for evaluating a waveform evaluation model.

The algorithm storage unit 110 stores an algorithm for generating pseudo waveform data from waveform data. The algorithm storage unit 110 may store a plurality of algorithms.

The pseudo waveform storage unit 168 stores the pseudo waveform data generated by the generation unit 13. The pseudo waveform storage unit 168 may function as the data storage unit 118.

The registration unit 12 executes various types of registration. For example, the registration unit 12 registers waveform data. The registration unit 12 stores the registered waveform data in the waveform storage unit 102.

The registration unit 12 may register waveform data which is a source of generating pseudo waveform data. The registration unit 12 registers, for example, so-called raw waveform data. The registration unit 12 registers, for example, the waveform data generated by observing or measuring an arbitrary target system.

The registration unit 12 may register the abnormal waveform data generated by observing or measuring the target system in a state where an abnormality occurs in the target system itself. For example, the registration unit 12 may register the abnormal waveform data generated by observing or measuring the target system in a state where an abnormality is intentionally caused to occur in the target system. In a case where the target system is a system that manufactures a product, the registration unit 12 may register the abnormal waveform data generated by observing or measuring the target system when an abnormality occurs in a product, and the abnormal waveform data generated by observing or measuring the product.

The registration unit 12 may register the normal waveform data generated by observing or measuring the target system while the target system is operating normally. In a case where the target system is a system that manufactures a product, the registration unit 12 may register the normal waveform data generated by observing or measuring the target system when a product is normal, and the normal waveform data generated by observing or measuring the product.

The generation unit 13 generates pseudo waveform data from the waveform data stored in the waveform storage unit 102. The generation unit 13 may generate one piece of pseudo waveform data from one piece of waveform data. The generation unit 13 may generate a plurality of pieces of pseudo waveform data from one piece of waveform data. The generation unit 13 may generate a plurality of pieces of pseudo waveform data from a plurality of pieces of waveform data. The generation unit 13 may generate, from the plurality of pieces of waveform data, a larger number of pieces of pseudo waveform data than the number of pieces of waveform data. The generation unit 13 may include a waveform acquisition unit 160, an intention specification unit 162, a preprocessing unit 164, and a pseudo waveform generation unit 166.

The waveform acquisition unit 160 acquires waveform data which is a source of generating pseudo waveform data. The waveform acquisition unit 160 may acquire the waveform data from the waveform storage unit 102.

The intention specification unit 162 specifies the intention of the user. The user may be a person who uses the system 10. The intention specification unit 162 may specify the intention of the user for the generation of pseudo waveform data from waveform data.

For example, the intention specification unit 162 specifies, as the intention of the user, an algorithm used to generate pseudo waveform data from waveform data. The intention specification unit 162 may specify one or more algorithms among the plurality of algorithms stored in the algorithm storage unit 110 in accordance with the instruction of the user. The intention specification unit 162 may specify a plurality of algorithms to be continuously applied to the waveform data and the order of application in accordance with the instruction of the user.

For example, the intention specification unit 162 specifies, as the intention of the user, the parameter setting used to generate pseudo waveform data from waveform data. The intention specification unit 162 may specify parameter setting in accordance with the instruction of the user. As a specific example, the intention specification unit 162 specifies one or more parameter settings by receiving selection by the user for a plurality of parameter settings. In addition, as a specific example, the intention specification unit 162 specifies one or more parameter settings by receiving an input of parameter settings by the user.

For example, the intention specification unit 162 specifies, as the intention of the user, a combination of the algorithm and the parameter setting used to generate pseudo waveform data from waveform data. The intention specification unit 162 may specify one or more combinations of the algorithm and the parameter setting in accordance with the instruction of the user.

For example, when pseudo waveform data is generated from waveform data, the intention specification unit 162 specifies, as the intention of the user, preprocessing to be performed on the waveform data. The preprocessing may be processing of extracting a feature from waveform data. Examples of the preprocessing include fast Fourier transform (FFT), normalization, filtering, slicing, sampling frequency conversion, dimension conversion, and the like. The intention specification unit 162 may specify preprocessing to be continuously applied to the waveform data and the order of application in accordance with the instruction of the user.

For example, the intention specification unit 162 specifies, as the intention of the user, a combination of at least one of the algorithm or the parameter setting used to generate pseudo waveform data from waveform data and the preprocessing to be performed on the waveform data.

The preprocessing unit 164 performs at least one of a plurality of types of preprocessing on the waveform data acquired by the waveform acquisition unit 160. The preprocessing unit 164 may perform the preprocessing specified by the intention specification unit 162 on the waveform data acquired by the waveform acquisition unit 160. When the intention specification unit 162 specifies a plurality of types of preprocessing to be continuously applied to the waveform data and the order of application, the preprocessing unit 164 may sequentially apply the plurality of types of preprocessing to the waveform data in accordance with the order.

The pseudo waveform generation unit 166 generates pseudo waveform data from the waveform data acquired by the waveform acquisition unit 160. For example, the pseudo waveform generation unit 166 generates the pseudo abnormal waveform data from the abnormal waveform data. For example, the pseudo waveform generation unit 166 generates the pseudo normal waveform data from the normal waveform data.

The pseudo waveform generation unit 166 may generate a plurality of pieces of pseudo waveform data from one piece of waveform data. The pseudo waveform generation unit 166 may generate a plurality of pieces of waveform data from one piece of waveform data by using at least one of a plurality of algorithms, a plurality of parameter settings, or a random number. For example, the pseudo waveform generation unit 166 generates a plurality of pieces of pseudo waveform data by using a plurality of algorithms for one piece of waveform data. For example, the pseudo waveform generation unit 166 generates a plurality of pieces of pseudo waveform data by using a plurality of parameter settings for one piece of waveform data. For example, the pseudo waveform generation unit 166 generates a plurality of pieces of pseudo waveform data by using a random number for one piece of waveform data. By using a plurality of algorithms, a plurality of parameter settings, a random number, and the like, pseudo waveform data of various variations can be generated from one piece of waveform data.

The pseudo waveform generation unit 166 may generate pseudo waveform data from waveform data in such a manner that the intention of the user specified by the intention specification unit 162 is reflected in the pseudo waveform data. For example, the pseudo waveform generation unit 166 generates the pseudo waveform data from the waveform data by using one or more algorithms specified by the intention specification unit 162. When the intention specification unit 162 specifies a plurality of algorithms to be continuously applied to the waveform data and the order of application, the pseudo waveform generation unit 166 may generate the pseudo waveform data from the waveform data by using the plurality of algorithms in accordance with the order. For example, the pseudo waveform generation unit 166 generates the pseudo waveform data from the waveform data by using one or more parameter settings specified by the intention specification unit 162. For example, the pseudo waveform generation unit 166 generates the pseudo waveform data from the waveform data by using the algorithm and the parameter setting for each of a plurality of combinations of the algorithm and the parameter setting specified by the intention specification unit 162. For example, the pseudo waveform generation unit 166 generates the pseudo waveform data from the waveform data after the preprocessing unit 164 performs one or more types of preprocessing specified by the intention specification unit 162. Although it may be difficult to generate the pseudo waveform data suitable for learning from waveform data, the generation of a plurality of types of pseudo waveform data is enabled in such a manner that the intention of the user is reflected in the pseudo waveform data, so that it is possible to increase the possibility of generating the pseudo waveform data suitable for learning.

The pseudo waveform generation unit 166 may process the waveform data so as not to greatly impair the physical meaning and generate the waveform data as pseudo waveform data. The pseudo waveform generation unit 166 may generate the pseudo waveform data by adding noise to the waveform data, processing the entire or partial section of the waveform data, expanding the waveform data in the graph vertical axis direction, contracting the waveform data in the graph vertical axis direction, expanding the waveform data in the graph horizontal axis direction, or contracting the waveform data in the graph horizontal axis direction.

For example, the pseudo waveform generation unit 166 generates the pseudo waveform data by using an algorithm (which may be described as a noise addition processing algorithm) which adds a random value based on a normal distribution having an average of 0 and a standard deviation a with respect to time-series waveform data. When the noise addition processing algorithm is used, the pseudo waveform generation unit 166 may generate a plurality of pieces of pseudo waveform data from one piece of waveform data by using a plurality of random values. When the noise addition processing algorithm is used, the pseudo waveform generation unit 166 may generate a plurality of pieces of pseudo waveform data from one piece of waveform data by using a plurality of parameter settings, for example, using a plurality of standard deviations a.

For example, the pseudo waveform generation unit 166 generates the pseudo waveform data by using an algorithm (which may be described as a scale deformation algorithm) which integrates a random value based on a normal distribution having an average of 1 and a standard deviation a with respect to time-series waveform data. When the scale deformation algorithm is used, the pseudo waveform generation unit 166 may generate a plurality of pieces of pseudo waveform data from one piece of waveform data by using a plurality of random values. When the scale deformation algorithm is used, the pseudo waveform generation unit 166 may generate a plurality of pieces of pseudo waveform data from one piece of waveform data by using a plurality of parameter settings, for example, using a plurality of standard deviations a.

For example, the pseudo waveform generation unit 166 generates the pseudo waveform data by using an algorithm (which may be described as an expansion processing algorithm) which decides reduce_ratio, decides a start point within a range of "time-series data size×(1−reduce_ratio)" from 0 of the time-series waveform data, sets, as an end point, a point advanced by "time-series data size×reduce_ratio" from the decided start point, cuts out a section of the end point from the start point, and enlarges the cut-out portion to the original size. When the expansion processing algorithm is used, the pseudo waveform generation unit 166 may generate a plurality of pieces of pseudo waveform data from one piece of waveform data by using a plurality of reduction ratios.

For example, the pseudo waveform generation unit 166 generates the pseudo waveform data by using an algorithm (which may be described as an expansion/contraction processing algorithm) which creates candidates of warp_scales, randomly decides one value from the candidates of warp_scales, decides window_ratio, calculates "warp_size=window_ratio×time-series data size", randomly secures a region corresponding to warp_size in a range of "a size in a time-series direction−warp_size−1" from 1, decides three regions of "a waveform before a region corresponding to warp_size", "a waveform of a region corresponding to warp_size", and "a waveform after a region corresponding to warp_size", enlarges or contracts a region of "a waveform of a region corresponding to warp_size" to a size of "warp_size×warp_scales", recombines "a waveform before a region corresponding to warp_size", "a waveform of a region corresponding to warp_size" after enlargement or contraction, and "a waveform after a region corresponding to warp_size", and returns to the original size. When the expansion/contraction processing algorithm is used, the pseudo waveform generation unit 166 may generate a plurality of pieces of pseudo waveform data from one piece of waveform data by using a plurality of parameter settings, for example, creating a plurality of candidates of warp_scales to use the plurality of candidates of warp_scales or using a plurality of window_ratios.

For example, the pseudo waveform generation unit 166 generates the pseudo waveform data by using an algorithm (which may be described as a scale random deformation algorithm) which decides the number of via-points, decides as many random values as the decided number of via-points on the basis of the normal distribution of the average value of 1 and the standard deviation σ (y-axis information), divides the size in the time-series direction by the number of via-points to arrange the via-points at equal intervals (x-axis information), creates a spline curve having the size in the time-series direction of the waveform data as an x axis by using the y-axis information and the x-axis information, and integrates the created spline curve and the waveform data. When the scale random deformation algorithm is used, the pseudo waveform generation unit 166 may generate a plurality of pieces of pseudo waveform data from one piece of waveform data by using a plurality of random values. When the scale random deformation algorithm is used, the pseudo waveform generation unit 166 may generate a plurality of pieces of pseudo waveform data from one piece of waveform data by using a plurality of parameter settings, for example, using the number of via-points of a plurality of patterns or using a plurality of standard deviations σ.

The pseudo waveform generation unit 166 may generate, from one or more pieces of waveform data, a pseudo waveform data set including a plurality of pieces of pseudo waveform data. The pseudo waveform generation unit 166 may generate various pseudo waveform data sets by using different algorithms, using different parameter settings, or using different types of preprocessing.

For example, the pseudo waveform generation unit 166 generates a pseudo abnormal waveform data set including a plurality of pieces of pseudo abnormal waveform data. The pseudo waveform generation unit 166 may generate a plurality of pseudo abnormal waveform data sets. For example, the pseudo waveform generation unit 166 generates a pseudo normal waveform data set including a plurality of pieces of pseudo normal waveform data.

The pseudo waveform storage unit 168 stores the pseudo waveform data generated by the pseudo waveform generation unit 166. The pseudo waveform storage unit 168 may store the pseudo waveform data in association with pseudo identification information indicating the data generated in a pseudo manner. By associating the pseudo waveform data with the pseudo identification information, it is possible to identify the pseudo waveform data from the raw waveform data.

The pseudo waveform storage unit 168 may store the pseudo waveform data set in association with the pseudo identification information. The pseudo waveform storage unit 168 may store the pseudo abnormal waveform data set in association with the pseudo identification information and abnormality identification information indicating abnormality data. The pseudo waveform storage unit 168 may store the pseudo normal waveform data set in association with the pseudo identification information and normal identification information indicating normality data.

The pseudo waveform storage unit 168 may store each of the plurality of pseudo waveform data sets generated by the pseudo waveform generation unit 166 in association with recipe information capable of identifying the algorithm, the data set, and the preprocessing used to generate the pseudo waveform data set. For example, when the pseudo waveform generation unit 166 generates a pseudo waveform data set from the waveform data by using the algorithm and the parameter setting for each of the plurality of combinations of the algorithm and the parameter setting, the pseudo waveform storage unit 168 associates each of the plurality of pseudo waveform data sets with the recipe information capable of identifying the combination of the algorithm and the parameter setting used to generate the pseudo waveform data set, and stores the plurality of pseudo waveform data sets. As a result, it is possible to grasp under what condition the pseudo waveform data set is generated with reference to the recipe information. In addition, the management of the pseudo waveform data set can be facilitated by the recipe information.

The pseudo waveform storage unit 168 may associate each of the plurality of pseudo waveform data sets generated by the pseudo waveform generation unit 166 with original waveform identification information capable of identifying waveform data which is a source of generating the pseudo waveform data set, and store the plurality of pseudo waveform data sets. When the pseudo waveform generation unit 166 generates a plurality of pseudo waveform data sets from one piece of waveform data, the pseudo waveform storage unit 168 may store the plurality of pseudo waveform data sets in association with original waveform identification information capable of identifying the one piece of waveform data. When the pseudo waveform generation unit 166 generates a plurality of pseudo waveform data sets from a plurality of pieces of waveform data, the pseudo waveform storage unit 168 may store the plurality of pseudo waveform data sets in association with original waveform identification information capable of identifying the set of the plurality of pieces of waveform data. As a result, when it is desired to compare a certain pseudo waveform data set with the original waveform data or when it is desired to use the original waveform data together in a case where a certain pseudo waveform data set is used for learning, it is possible to easily specify the original waveform data.

When the pseudo waveform generation unit 166 generates a pseudo waveform data set from the waveform data subjected to the preprocessing by the preprocessing unit 164, the pseudo waveform storage unit 168 may associate the pseudo waveform data set with preprocessing identification information capable of identifying the preprocessing and store the pseudo waveform data set. As a result, for a certain pseudo waveform data set, it is possible to easily grasp what type of preprocessing has been performed on the original waveform data and then the pseudo waveform data set has been generated.

The pseudo waveform confirmation processing unit 14 executes processing for causing the user to confirm the pseudo waveform data stored in the pseudo waveform storage unit 168. The pseudo waveform confirmation processing unit 14 may include a similarity display control unit 170, a range designation reception unit 172, and an in-range waveform selection unit 174.

The similarity display control unit 170 performs control to display, to the user, display data indicating the similarity between the pseudo waveform data generated from the waveform data by the pseudo waveform generation unit 166 and the waveform data which is a source of generating the pseudo waveform data. The similarity display control unit 170 displays display data on a display included in the system 10, for example. The similarity display control unit 170 may transmit the display data to an arbitrary apparatus and cause the apparatus to display the display data.

The similarity display control unit 170 may perform control to display, to the user, display data indicating the similarity between the plurality of pieces of pseudo waveform data generated from the waveform data by the pseudo waveform generation unit 166 and the waveform data which is a source of generation. The similarity display control unit 170 may perform control to display, to the user, display data indicating how much variation the plurality of pieces of pseudo waveform data is generated to have with respect to the waveform data which is a source of generating the plurality of pieces of pseudo waveform data. For example, the similarity display control unit 170 calculates the similarity between each of the plurality of pieces of pseudo waveform data and the waveform data which is a source of generating the pseudo waveform data, and displays display data including at least one of a histogram or a graph indicating the number of pieces of pseudo waveform data for each similarity. The similarity may be, for example, a value indicating that the closer to 1, the more similar to the original waveform data, and the closer to 0, the more deviated from the original waveform data.

For example, the similarity display control unit 170 may set a correlation coefficient between the waveform data and the pseudo waveform data as the similarity between the waveform data and the pseudo waveform data. The similarity display control unit 170 may calculate the similarity between the waveform data and the pseudo waveform data by any method as long as the similarity can represent the degree of similarity between the waveform data and the pseudo waveform data.

When a plurality of pieces of pseudo waveform data is generated from one piece of waveform data, the similarity display control unit 170 may calculate the similarity between each of the plurality of pieces of pseudo waveform data and the waveform data. When the plurality of pieces of pseudo waveform data is generated from the plurality of pieces of waveform data, the similarity display control unit 170 may calculate the similarity between the pseudo waveform data and each of the plurality of pieces of waveform data for each of the plurality of pieces of pseudo waveform data, and set the average thereof as the similarity between the waveform data and the pseudo waveform data.

The similarity display control unit 170 may perform control to display, to the user, display data indicating the similarity between the pseudo waveform data and the waveform data which is a source of generating the pseudo waveform data and other display data indicating the similarity between the pseudo waveform data and other waveform data different from the waveform data which is a source of generating the pseudo waveform data. For example, the similarity display control unit 170 performs control to display, to the user, display data indicating the similarity between the pseudo abnormal waveform data generated from the abnormal waveform data and the abnormal waveform data and display data indicating the similarity between the pseudo abnormal waveform data and the normal waveform data. As a result, the user can grasp a relationship between the generated pseudo abnormal waveform data and the normal waveform data in addition to a relationship between the generated pseudo abnormal waveform data and the original abnormal waveform data. By making it possible to grasp the relationship between the pseudo abnormal waveform data and the normal waveform data, for example, the pseudo abnormal waveform data having a lower similarity with the normal waveform data and having a high possibility of being effective for learning can be specified among the pseudo abnormal waveform data having the same similarity with the original abnormal waveform data.

The similarity display control unit 170 may perform control to display, to the user, display data indicating the similarity between each of the plurality of pseudo waveform data sets generated by the pseudo waveform generation unit 166 and the waveform data which is a source of generation. For example, for each of the plurality of pseudo waveform data sets, the similarity display control unit 170 calculates the similarity between the plurality of pieces of pseudo waveform data included in the pseudo waveform data set and the waveform data which is a source of generation, and displays display data including at least one of a histogram or a graph indicating the number of pieces of pseudo waveform data for each similarity. As a result, for example, a histogram corresponding to each of the plurality of pseudo waveform data sets can be presented to the user and can be used as a material for examining which pseudo waveform data set is used for learning. Specifically, it is possible to perform examination such as selecting only a pseudo waveform data set having high similarity with the original waveform data among a plurality of pseudo waveform data sets or including a pseudo waveform data set having not very high similarity with the original waveform data.

The range designation reception unit 172 receives designation of a similarity range by the user for the display data displayed by the similarity display control unit 170. For example, the range designation reception unit 172 receives designation of a similarity range with respect to a histogram or a graph, which is displayed by the similarity display control unit 170, indicating the number of pieces of pseudo waveform data for each similarity with the original waveform data. The range designation reception unit 172 receives, for example, the input of the user for an upper limit and a lower limit of similarity. The range designation reception unit 172 receives, for example, the input of the user to select a similarity range with respect to a histogram or a graph in the display data.

The in-range waveform selection unit 174 selects the plurality of pieces of pseudo waveform data corresponding to the similarity range for which designation has been received by the range designation reception unit 172. For example, the in-range waveform selection unit 174 selects the pseudo waveform data corresponding to each similarity within the similarity range for which designation has been received by the range designation reception unit 172.

The pseudo waveform storage unit 168 may store a pseudo waveform data set including the plurality of pieces of pseudo waveform data selected by the in-range waveform selection unit 174. The pseudo waveform storage unit 168 may store, as a data set used for learning, a pseudo waveform data set including the plurality of pieces of pseudo waveform data selected by the in-range waveform selection unit 174. As a result, the user can easily examine to which range the pseudo waveform data similar to the original waveform data is adopted among a large number of pieces of pseudo waveform data included in one or more pseudo waveform data sets, to which range the pseudo waveform data not similar to the original waveform data is not adopted, and the like.

The similarity display control unit 170 may perform control to display, to the user, display data capable of comparing the pseudo waveform data set and the waveform data which is a source of generation at a waveform level. For example, when the pseudo waveform data set is generated from one piece of waveform data, the similarity display control unit 170 displays display data in which one piece of waveform data and the plurality of pieces of pseudo waveform data included in the pseudo waveform data set are arranged on a graph. For example, when the pseudo waveform data set is generated from a plurality of pieces of waveform data, the similarity display control unit 170 displays the display data in which the plurality of pieces of waveform data and the plurality of pieces of pseudo waveform data included in the pseudo waveform data set are arranged on a graph. For example, when the pseudo waveform data set is generated from a plurality of pieces of waveform data, the similarity display control unit 170 displays the display data in which the average waveform of the plurality of pieces of waveform data and the plurality of pieces of pseudo waveform data included in the pseudo waveform data set are arranged on a graph.

The learning unit 15 executes machine learning using the pseudo waveform data generated by the generation unit 13. The learning unit 15 may include the learning data storage unit 106, the algorithm storage unit 144, the learning execution unit 140, and a waveform evaluation model storage unit 146.

The learning data storage unit 106 stores learning data used for learning. The learning data storage unit 106 may acquire the waveform data stored in the waveform storage unit 102 from the waveform storage unit 102 and store the waveform data. The learning data storage unit 106 may acquire the pseudo waveform data stored in the pseudo waveform storage unit 168 from the pseudo waveform storage unit 168 and store the pseudo waveform data.

The learning data storage unit 106 may acquire, from the pseudo waveform storage unit 168, the pseudo waveform data selected as the learning data among the plurality of pieces of pseudo waveform data stored in the pseudo waveform storage unit 168 and store the pseudo waveform data. For example, the pseudo waveform storage unit 168 acquires, from the pseudo waveform storage unit 168, the pseudo waveform data set selected as the learning data set among the plurality of pseudo waveform data sets stored in the pseudo waveform storage unit 168 and stores the pseudo waveform data set. The learning data storage unit 106 may acquire the pseudo waveform data set stored as the data set used for learning by the pseudo waveform storage unit 168 from the pseudo waveform storage unit 168 and store the pseudo waveform data set. The learning data storage unit 106 may acquire, from the pseudo waveform storage unit 168, the pseudo waveform data set and information associated with the pseudo waveform data set, such as recipe information, original waveform identification information, preprocessing identification information, pseudo identification information, abnormality identification information, and normal identification information, and store them. The algorithm storage unit 144 stores a plurality of learning algorithms. Examples of the learning algorithm include a neural network (NN), a visual geometry group (VGG), and a support vector machine (SVM), but are not limited thereto, and any algorithm may be used.

The learning execution unit 140 executes machine learning using the learning data stored in the learning data storage unit 106 to generate a waveform evaluation model which outputs an evaluation result of the input waveform data. The learning execution unit 140 may generate the waveform evaluation model by using the learning algorithm designated by the user among the plurality of learning algorithms stored in the algorithm storage unit 144.

The learning execution unit 140 may evaluate the generated waveform evaluation model. For example, the learning execution unit 140 evaluates the waveform evaluation model by using the waveform data for evaluation registered in advance by the registration unit 12 and stored in the waveform storage unit 102. The learning execution unit 140 may evaluate the waveform evaluation model by using the waveform data for evaluation selected by the user among a plurality of pieces of waveform data for evaluation.

The learning execution unit 140 may evaluate the waveform evaluation model without using the pseudo waveform data. For example, when the pseudo waveform data or the pseudo waveform data set is selected as the waveform data for evaluation, the learning execution unit 140 does not use the selected pseudo waveform data for evaluating. For example, the learning execution unit 140 performs control such that the pseudo waveform data and the pseudo waveform data set cannot be selected when the user selects the waveform data for evaluation. As a result, the waveform data generated in a pseudo manner can be prevented from being used for the evaluation of the waveform evaluation model, and the possibility that the credibility of the evaluation of the waveform evaluation model is lowered can be reduced.

The waveform evaluation model storage unit 146 stores the waveform evaluation model generated by the learning execution unit 140. When the learning execution unit 140 generates the waveform evaluation model by executing machine learning using the pseudo waveform data associated with the preprocessing identification information, the waveform evaluation model storage unit 146 may associate the waveform evaluation model with the preprocessing identification information and store the waveform evaluation model.

The evaluation execution unit 16 executes the evaluation of the waveform data by using the waveform evaluation model generated by the learning unit 15. The evaluation execution unit 16 may include a model acquisition unit 180, an input waveform acquisition unit 182, a waveform input unit 184, and an evaluation result output control unit 186.

The model acquisition unit 180 acquires the waveform evaluation model stored in the waveform evaluation model storage unit 146. When the preprocessing identification information is associated with the waveform evaluation model, the model acquisition unit 180 acquires the waveform evaluation model and the preprocessing identification information.

The input waveform acquisition unit 182 acquires input waveform data to be evaluated. The input waveform acquisition unit 182 may acquire input waveform data which the user gives an instruction to input.

The waveform input unit 184 inputs the input waveform data acquired by the input waveform acquisition unit 182 to the waveform evaluation model acquired by the model acquisition unit 180. When the model acquisition unit 180 acquires the waveform evaluation model and the preprocessing identification information, the waveform input unit 184 may perform the preprocessing indicated by the preprocessing identification information on the input waveform data acquired by the input waveform acquisition unit 182 and input the result to the waveform evaluation model. As a result, the evaluation accuracy of the waveform can be improved as compared with a case where the preprocessing indicated by the preprocessing identification information is not performed. In addition, at the time of evaluation by the evaluation execution unit 16, it is possible to prevent the occurrence of a load for separately managing what type of preprocessing is performed to generate the pseudo waveform data used to generate the waveform evaluation model acquired by the model acquisition unit 180.

The evaluation result output control unit 186 performs control to output the evaluation result of the input waveform data output from the waveform evaluation model. For example, the evaluation result output control unit 186 causes the display of the system 10 to display and output the evaluation result of the input waveform data. The evaluation result output control unit 186 may transmit the evaluation result of the input waveform data to an arbitrary apparatus and cause the apparatus to display the evaluation result.

The system 10 may be constituted by one apparatus. The system 10 may be constituted by a plurality of apparatuses. For example, the system 10 is constituted by an apparatus including the storage unit 11, the registration unit 12, the generation unit 13, the pseudo waveform confirmation processing unit 14, and the learning unit 15, and an apparatus including the evaluation execution unit 16. In this case, the model acquisition unit 180 receives, from the system 10, the waveform evaluation model stored in the waveform evaluation model storage unit 146. The apparatus including the evaluation execution unit 16 may be realized by a program that causes an existing apparatus to function as the evaluation execution unit 16. The evaluation execution unit 16 is mounted on the apparatus by the program, and the apparatus can acquire the waveform evaluation model stored in the waveform evaluation model storage unit 146 and realize the waveform evaluation using the waveform evaluation model. When the waveform evaluation model is associated with the preprocessing identification information, the waveform input unit 184 automatically performs the preprocessing indicated by the preprocessing identification information on the input waveform data acquired by the input waveform acquisition unit 182 and inputs the result to the waveform evaluation model, and thus, when the input waveform data is input to the waveform evaluation model on the user side of the evaluation execution unit 16, it is possible to save time and effort to perform management for specific preprocessing, and decrease in evaluation accuracy can be prevented by inputting the input waveform data to the waveform evaluation model without performing specific preprocessing.

The system 10 may be constituted by an apparatus including the storage unit 11, the registration unit 12, the generation unit 13, and the pseudo waveform confirmation processing unit 14, an apparatus including the learning unit 15, and an apparatus including the evaluation execution unit 16. The system 10 may be implemented by an apparatus configuration other than these.

Figure 6:
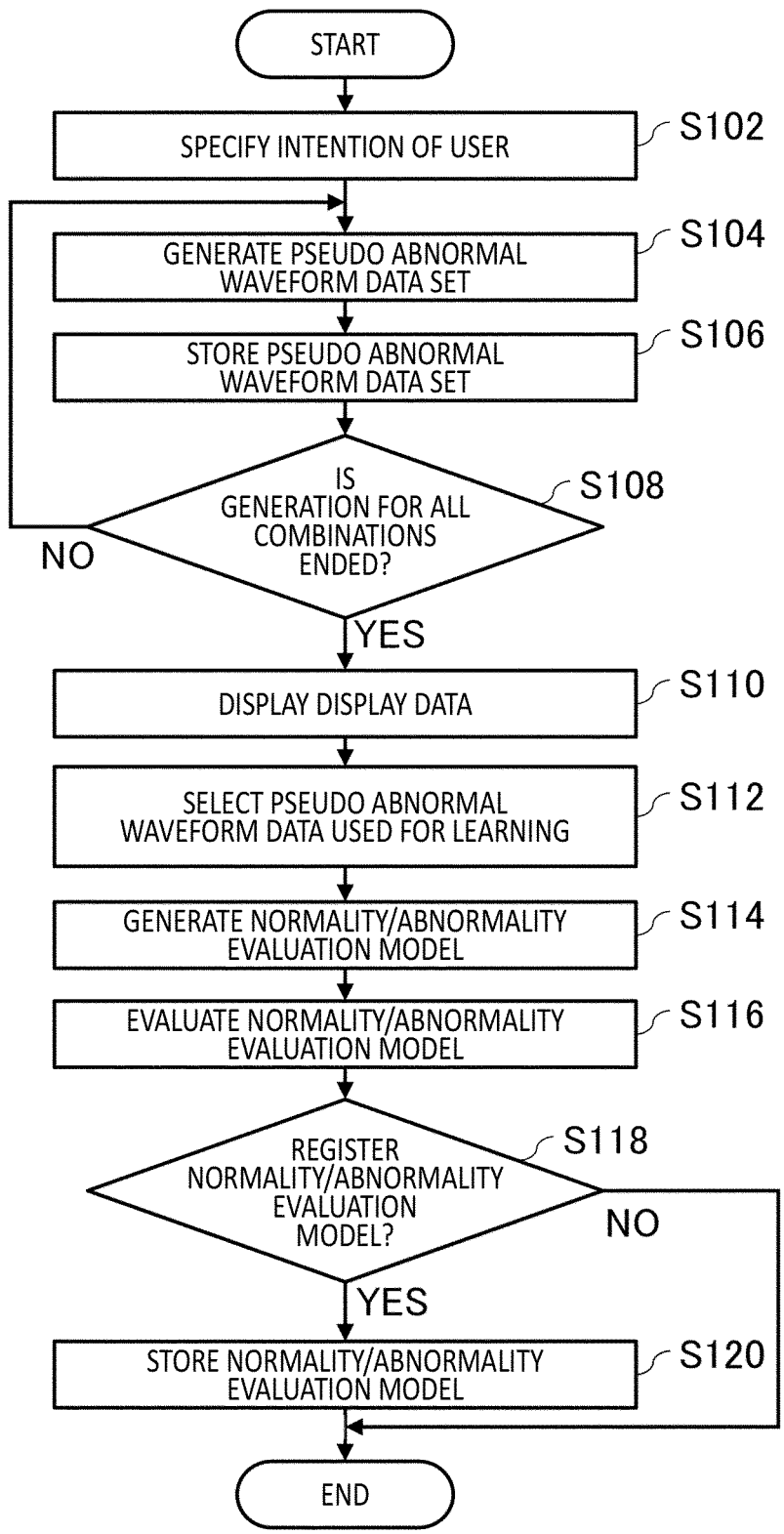
FIG. 6 schematically illustrates an example of a flow of generation processing of a waveform evaluation model by the system 10.

FIG. 6 schematically illustrates an example of a flow of generation processing of a waveform evaluation model by the system 10. Here, processing in which the system 10 generates a large amount of pseudo abnormal waveform data by using a small amount of abnormal waveform data stored in the waveform storage unit 102 and generates a normality/abnormality evaluation model for evaluating whether the input waveform data is a normal waveform or an abnormal waveform by using the pseudo abnormal waveform data, the abnormal waveform data, and the normal waveform data will be described as an example.

In step (the step may be abbreviated as S) 102, the intention specification unit 162 specifies the intention of the user. The intention specification unit 162 may specify a plurality of combinations of preprocessing, algorithms, and parameter settings in accordance with the instruction of the user.

In S104, the preprocessing unit 164 and the pseudo waveform generation unit 166 perform preprocessing on a small amount of abnormal waveform data for one combination of the plurality of combinations, and then generate a pseudo abnormal waveform data set by using the algorithm and the parameter setting.

In S106, the pseudo waveform storage unit 168 stores the pseudo abnormal waveform data set generated in S104 in association with pseudo identification information, original waveform identification information, preprocessing identification information, and recipe information.

When the generation of the pseudo abnormal waveform data set has not been ended for all of the plurality of combinations specified in S102 (NO in S108), the process returns to S104, and when the preprocessing unit 164 and the pseudo waveform generation unit 166 generate the pseudo abnormal waveform data set for the next combination and it is determined that the generation is ended (YES in S108), the process proceeds to S110.

In S110, the similarity display control unit 170 performs control to display, to the user, display data indicating the similarity between each of the plurality of pseudo abnormal waveform data sets and a small amount of abnormal waveform data which is a source of generation. In S112, the range designation reception unit 172 and the in-range waveform selection unit 174 select the pseudo abnormal waveform data used for learning. When receiving the designation of a similarity range by the user, the range designation reception unit 172 and the in-range waveform selection unit 174 select, as the pseudo abnormal waveform data used for learning, the plurality of pseudo abnormal waveform data corresponding to the similarity range for which the designation has been received. When all of the pseudo abnormal waveform data sets are selected by the user, the range designation reception unit 172 and the in-range waveform selection unit 174 may select, as the pseudo abnormal waveform data used for learning, all of the pseudo abnormal waveform data included in all of the pseudo abnormal waveform data sets.

In S114, the learning execution unit 140 generates a normality/abnormality evaluation model by executing machine learning using the pseudo abnormal waveform data selected by the range designation reception unit 172 and the in-range waveform selection unit 174 in S112, the normal waveform data, and the abnormal waveform data. Note that after S102 to S112 are performed a plurality of times, the process may proceed to S114. In S116, the learning execution unit 140 evaluates the normality/abnormality evaluation model generated in S114 by using the waveform data for evaluation stored in the waveform storage unit 102.

When the registration instruction of the normality/abnormality evaluation model by the user is received (YES in S118), the process proceeds to S120, and when the registration instruction is not received (NO in S118), the process ends. In S120, the waveform evaluation model storage unit 146 stores the normality/abnormality evaluation model generated in S114 in association with the preprocessing identification information. Then, the process ends.

By the system 10 executing the processing illustrated in FIG. 6, a large number of pieces of pseudo abnormal waveform data on which the intention of the user is reflected are generated even when a small amount of abnormal waveform data, and the normality/abnormality evaluation model can be generated by using the pseudo abnormal waveform data selected by the user while confirming the display data, which can contribute to generation of the normality/abnormality evaluation model with high evaluation accuracy.

FIG. 7 schematically illustrates an example of the management data 190 for managing the pseudo waveform data. The system 10 may generate a plurality of projects and manage various types of data for each project. As a result, for example, when it is desired to target a plurality of types of data such as data for evaluating normality/abnormality of a ball screw and data for evaluating normality/abnormality of a motor, the management can be facilitated.

For example, the registration unit 12 generates a project and registers waveform data in accordance with the instruction of the user. The registration unit 12 may register abnormal waveform data, normal waveform data, waveform data for evaluation, and the like. The waveform storage unit 102 stores the waveform data in association with the project. When the pseudo waveform data set is generated by the pseudo waveform generation unit 166 using the waveform data corresponding to the project, the pseudo waveform storage unit 168 stores the pseudo waveform data set and related information in association with the project. Examples of the related information include the number of pieces of data included in the pseudo waveform data set, original waveform identification information, preprocessing identification information, and recipe information.

FIG. 7 illustrates a state where a data set "abnormality data A of ball screw" and a data set "abnormality data B of ball screw" are registered in a project named "pseudo waveform of ball screw". The management data 190 allows the user to confirm that the number of pieces of data of "abnormality data A of ball screw" is 80, that the original waveform is raw abnormality data A, that the original waveform is not subjected to preprocessing, and that a noise addition processing algorithm with a standard deviation of 0.0002 is used for generation, or that the number of pieces of data of "abnormality data B of ball screw" is 80, that the original waveform is the raw abnormality data A, that down-sampling with a sampling rate of 6 is performed as preprocessing, and that an expansion/contraction processing algorithm with warp_scales of [0.5, 2.0] and window_ratio of 0.1 is used for generation, which can be a material for examining what type of preprocessing, algorithm, and parameter setting are used to generate the pseudo waveform data next.

Figure 8:
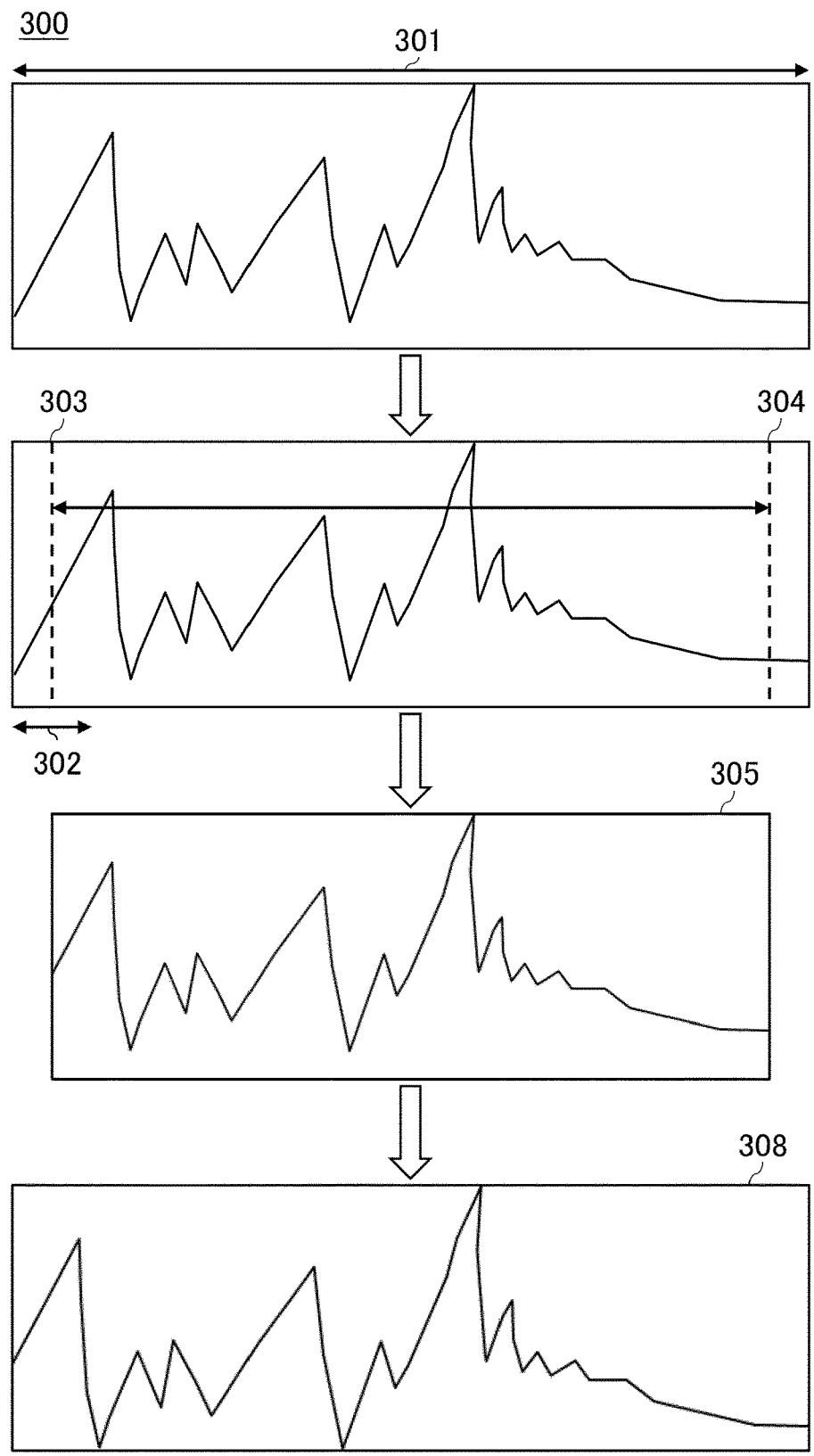
FIG. 8 illustrates an explanatory diagram for explaining an expansion processing algorithm.

FIG. 8 illustrates an explanatory diagram for explaining an expansion processing algorithm. Here, a case where pseudo waveform data 308 is generated from the waveform data 300 with reduce_ratio=0.9 will be described as an example.

The pseudo waveform generation unit 166 randomly decides a start point 303 in a range 302 of a time-series data size 301 of the waveform data 300×(1−reduce_ratio) from the time-series start point of the waveform data 300. The pseudo waveform generation unit 166 sets, as an end point 304, a point advanced by the time-series data size 301× reduce_ratio from the start point 303. The pseudo waveform generation unit 166 cuts out a section 305 from the start point 303 to the end point 304. The pseudo waveform generation unit 166 enlarges the cut section 305 to the original size to obtain the pseudo waveform data 308.

Even if reduce_ratio is fixed, the start point 303 is randomly decided, so that different pseudo waveform data 308 is generated every time even from the same waveform data 300. By changing reduce_ratio, the pseudo waveform data 308 having more variations can be generated.

Figure 9:
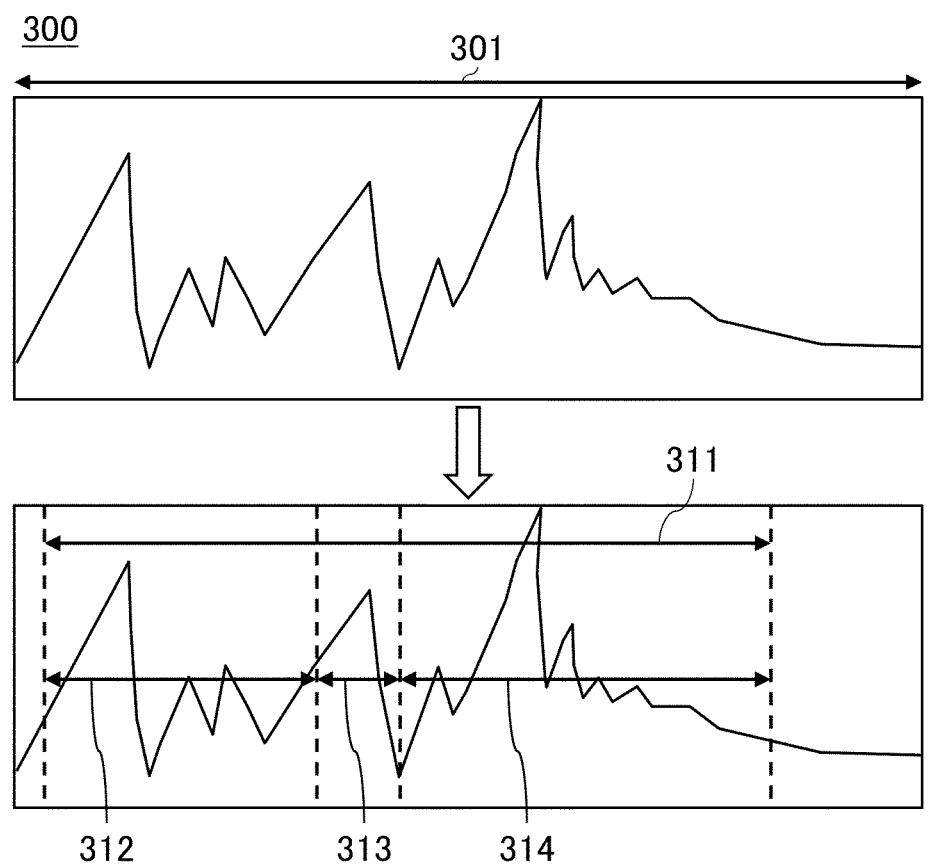
FIG. 9 illustrates an explanatory diagram for explaining an expansion/contraction processing algorithm.

FIG. 9 illustrates an explanatory diagram for explaining the expansion/contraction processing algorithm. Here, a case where the pseudo waveform data is generated from the waveform data 300 with warp_scales=[0.5, 2] and window_ratio=0.1 will be described as an example.

The pseudo waveform generation unit 166 randomly decides one value from warp_scales. The pseudo waveform generation unit 166 calculates warp_size=window_ratio× time-series data size 301. The pseudo waveform generation unit 166 randomly secures a region of warp_size in a range 311 of "time-series data size 301−warp_size 1" from 1, and decides three regions of a waveform 312 before the region of warp_size, a waveform 313 of the region of warp_size, and a waveform 314 after the region of warp_size. The pseudo waveform generation unit 166 generates pseudo waveform data by enlarging or contracting the region of the waveform 313 to the size of "warp_size×warp_scales", combining the waveform 312, the enlarged or contracted waveform 313, and the waveform 314 again, and returning to the original size.

By randomly deciding one value from warp_scales, different pseudo waveform data is generated every time even from the same waveform data 300. By setting many candidates for warp_scales, the pseudo waveform data having more variations can be generated.

Figure 10:
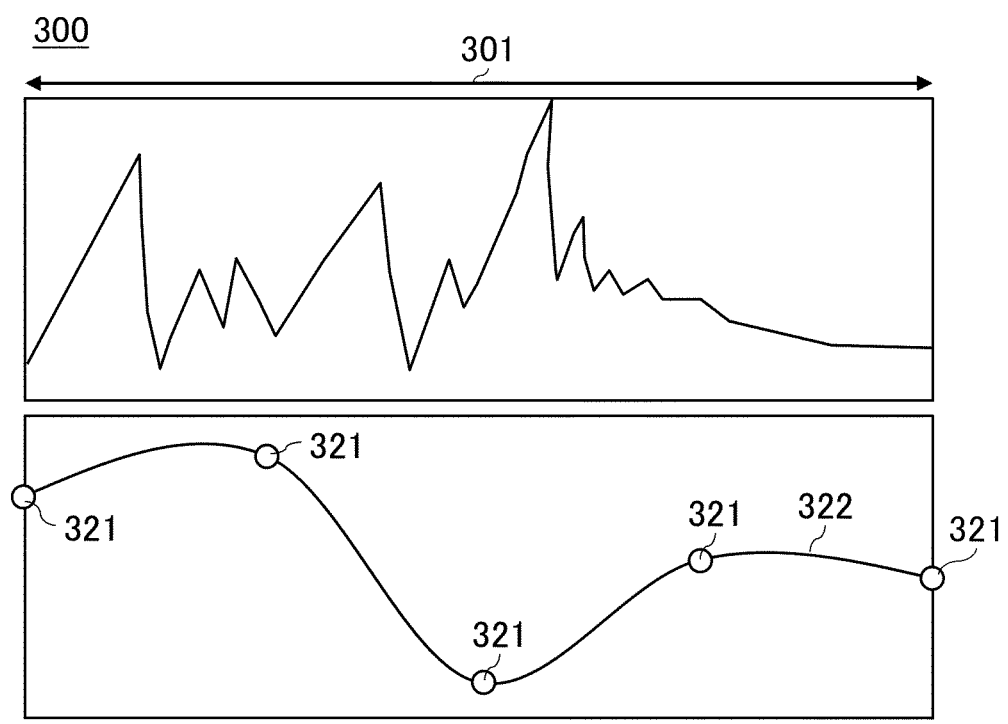
FIG. 10 illustrates an explanatory diagram for explaining a scale random deformation algorithm.

FIG. 10 illustrates an explanatory diagram for explaining a scale random deformation algorithm. Here, a case where pseudo waveform data is generated from the waveform data 300 with the number of via-points set to 5 will be described as an example.

The pseudo waveform generation unit 166 decides as many random values as the number of via-points on the basis of the normal distribution of the average value of 1 and the standard deviation a (y-axis information), divides the size in the time-series direction by the number of via-points, and arranges the via-points 321 at equal intervals (x-axis information). Using the y-axis information and the x-axis information, the pseudo waveform generation unit 166 creates a spline curve 322 having the time-series data size 301 of the waveform data as an x axis. The pseudo waveform generation unit 166 generates pseudo waveform data by integrating the created spline curve 322 and the waveform data.

Even if the number of via-points is fixed, a random value is decided as the y-axis information, so that different pseudo waveform data is generated every time even from the same waveform data 300. By changing the number of via-points, the pseudo waveform data having more variations can be generated.

Figure 11:
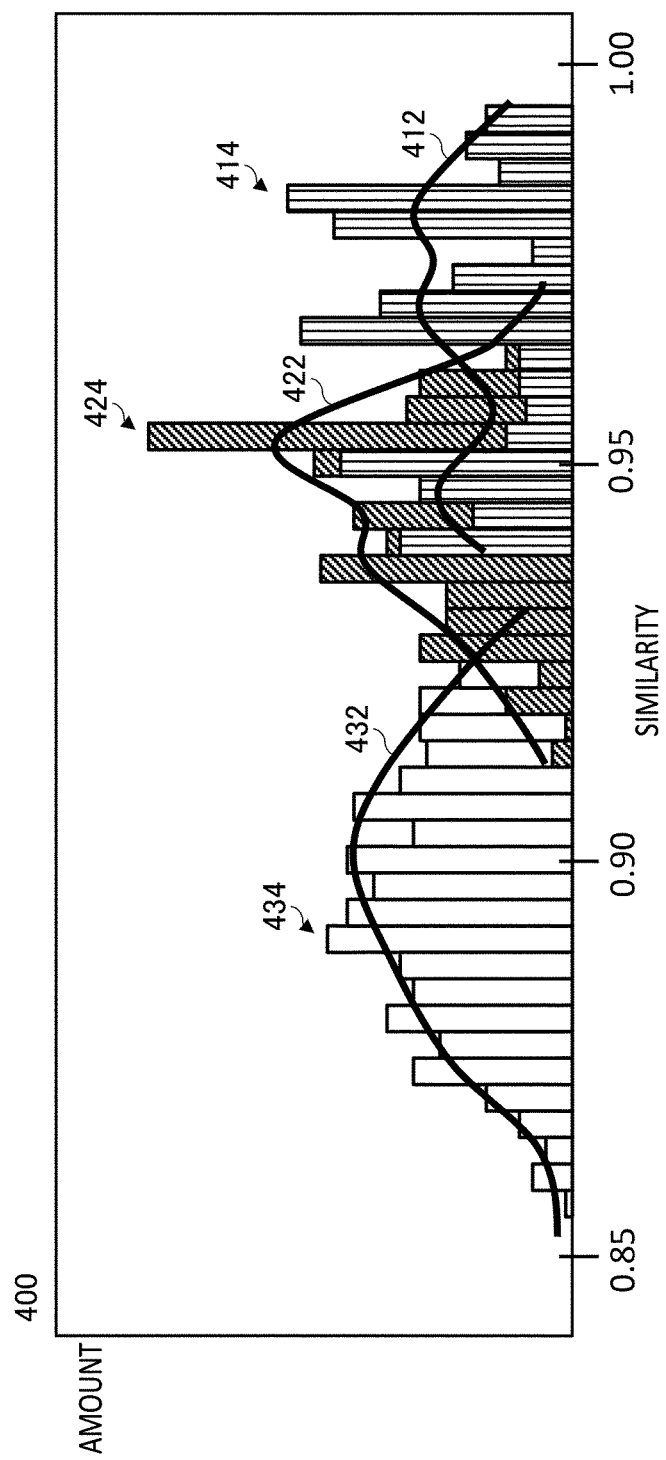
FIG. 11 schematically illustrates an example of display data 400 displayed by a similarity display control unit 170.

FIG. 11 schematically illustrates an example of display data 400 displayed by the similarity display control unit 170. In the display data 400, a horizontal axis represents the similarity between the waveform data which is a source of generating the pseudo waveform data and the pseudo waveform data, and a vertical axis represents an amount which is the number of pieces of pseudo waveform data.

FIG. 11 illustrates the display data 400 including a graph 412 and a histogram 414 corresponding to a first pseudo waveform data set among three pseudo waveform data sets, a graph 422 and a histogram 424 corresponding to a second pseudo waveform data set, and a graph 432 and a histogram 434 corresponding to a third pseudo waveform data set.

The similarity display control unit 170 may switch on/off of display of each of the graph 412, the histogram 414, the graph 422, the histogram 424, the graph 432, and the histogram 434 in accordance with the instruction of the user. The similarity display control unit 170 may apply semitransparent display or the like to each of the graph 412, the histogram 414, the graph 422, the histogram 424, the graph 432, and the histogram 434.

With the display data 400, it is possible to easily grasp how much similar each pseudo waveform data set is to the original waveform data, how much variation each pseudo waveform data set is generated to have, and the like.

The range designation reception unit 172 may receive designation of a similarity range for the pseudo waveform data set selected by the user among the plurality of pseudo waveform data sets. For example, when the graph 412 and the histogram 414 are selected by the user, the range designation reception unit 172 receives designation of a similarity range for the graph 412 and the histogram 414. The in-range waveform selection unit 174 may select the pseudo waveform data, which corresponds to the similarity range for which designation has been received, in the graph 412 and the histogram 414. As a result, it is possible to realize an operation of first deciding which pseudo waveform data set is to be adopted among a plurality of target pseudo waveform data sets and then selecting a range of the pseudo waveform data set to be adopted.

The range designation reception unit 172 may receive designation of a similarity range for a plurality of pseudo waveform data sets. For example, the range designation reception unit 172 receives designation of a similarity range for the graph 412, the histogram 414, the graph 422, the histogram 424, the graph 432, and the histogram 434. The in-range waveform selection unit 174 may select the pseudo waveform data, which corresponds to the similarity range for which designation has been received, in the graph 412, the histogram 414, the graph 422, the histogram 424, the graph 432, and the histogram 434.

In the above embodiment, the abnormality/normality evaluation model has been described as an example of the waveform evaluation model, but the present invention is not limited thereto. For example, the system 10 may generate various types of waveform evaluation models, such as a fault timing evaluation model that evaluates a fault timing of a target system.

The system 10 may target not only one-dimensional data such as waveform data but also two-dimensional data such as an image. For example, the system 10 may generate pseudo two-dimensional data from two-dimensional data. The system 10 may apply the above-described pseudo waveform generation function to the two-dimensional data on the assumption that a horizontal axis represents time and a vertical axis represents frequency in the two-dimensional data. For example, the system 10 applies the above-described pseudo waveform generation function to the frequency component obtained by cutting out the two-dimensional data for each column (for each time). By performing similar processing for all times and then combining, the pseudo waveform generation function can be applied to the two-dimensional data.

Figure 12:
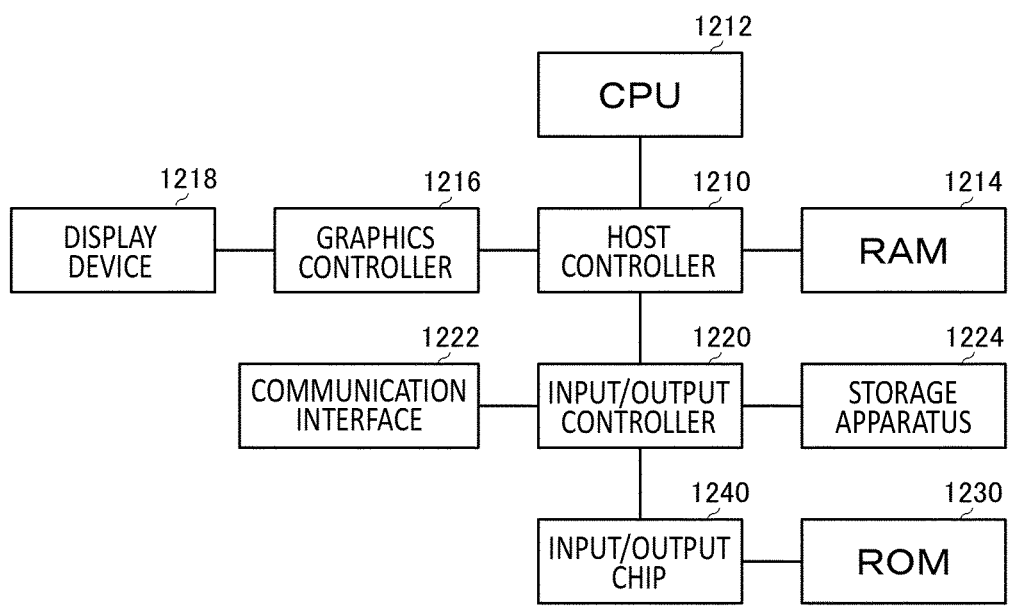
FIG. 12 schematically illustrates an example of a hardware configuration of a computer 1200 that functions as the system 10 or a part of the system 10.

FIG. 12 schematically illustrates an example of a hardware configuration of a computer 1200 that functions as the system 10 or a part of the system 10. The computer 1200 functioning as a part of the system 10 functions as, for example, an apparatus including the storage unit 11, the registration unit 12, the generation unit 13, and the pseudo waveform confirmation processing unit 14. The computer 1200 functioning as a part of the system 10 functions as, for example, an apparatus including the storage unit 11, the registration unit 12, the generation unit 13, the pseudo waveform confirmation processing unit 14, and the learning unit 15. The computer 1200 functioning as a part of the system 10 functions as, for example, an apparatus including the learning unit 15. The computer 1200 functioning as a part of the system 10 functions as, for example, an apparatus including the evaluation execution unit 16. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes input/output units such as a communication interface 1222, a storage apparatus 1224, a DVD drive and an IC card drive, which are connected to the host controller 1210 via an input/output controller 1220. The DVD drive may be a DVD-ROM drive, a DVD-RAM drive, and the like. The storage apparatus 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage apparatus 1224 stores a program and data used by the CPU 1212 in the computer 1200. The DVD drive reads the programs or the data from the DVD-ROM or the like, and provides the storage apparatus 1224 with the programs or the data. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage apparatus 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. An apparatus or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage apparatus 1224, the DVD drive (DVD-ROM), the IC card, etc., and perform various types of processing on the data on the RAM 1214. Then, the CPU 1212 may write the processed data back in the external recording medium.

Various types of information such as various types of programs, data, tables, and databases may be stored in a recording medium and subjected to information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The above described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of apparatuses responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing apparatus locally or via a local area network (LAN), a wide area network (WAN) such as the Internet or the like in order that the general purpose computer, the special purpose computer, or the processor or the programmable circuitry of the other programmable data processing apparatus performs the computer-readable instruction to provide means for performing operations specified by the flowchart or the block diagram. Here, the computer may be a personal computer (PC), a tablet computer, a smart phone, a workstation, a server computer, or a computer such as a general purpose computer or a special purpose computer, or may be a computer system to which a plurality of computers are connected. Such computer system to which the plurality of computers are connected is also referred to as a distributed computing system, and is a computer in a broad sense. In a distributed computing system, a plurality of computers collectively execute a program by each of the plurality of computers executing a portion of the program, and passing data during the execution of the program among the computers as needed. An example of the processor includes a computer processor, a central processing unit, a processing unit, a microprocessor, a digital signal processor, a controller, a microcontroller, or the like. The computer may include one or more processors. In a multi-processor system including a plurality of processors, the plurality of processors collectively execute a program by each of the processors executing a portion of the program, and passing data during the execution of the program among the computers as needed. For example, in execution of multiple tasks, each of the plurality of processors may execute a portion of each task pieces by pieces by performing task-switching for each time slice. In this case, which portion of one program each processor is responsible for executing dynamically changes. Moreover, which portion of the program each of the plurality of processor is responsible for executing may be determined statically by multiprocessor-aware programming. The one or more processors may function as a waveform acquisition unit 160. The one or more processors may function as an intention specification unit 162. The one or more processors may function as a preprocessing unit 164. The one or more processors may function as a pseudo waveform generation unit 166. The one or more processors may function as a similarity display control unit 170. The one or more processors may function as an in-range waveform selection unit 174. The one or more processors may function as a learning execution unit 140. The one or more processors may function as a model acquisition unit 180. The one or more processors may function as a waveform input unit 184. The one or more processors may function as an evaluation result output control unit 186. The computer may include an interface which receives an input by a user. The interface may include an input device such as a mouse, a keyboard, and a touch panel. The interface may function as a range designation reception unit 172.

While the present invention has been described by way of the embodiments, the technical scope of the present invention is not limited to the scope described in the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 11: storage unit; 12: registration unit; 13: generation unit; 14: pseudo waveform confirmation processing unit; 15: learning unit; 16: evaluation execution unit; 102: waveform storage unit; 104: augmentation processing; 106: learning data storage unit; 108: user input; 110: algorithm storage unit; 112: selection processing; 114: parameter setting processing; 116: generation processing; 118: data storage unit; 120: user intention/reflection processing; 122: distribution display processing; 124: selection processing; 126: individual display processing; 128: range selection processing; 130: learning data storage unit; 140: learning execution unit; 142: AI; 144: algorithm storage unit; 146: waveform evaluation model storage unit; 150: application; 160: waveform acquisition unit; 162: intention specification unit; 164: preprocessing unit; 166: pseudo waveform generation unit; 168: pseudo waveform storage unit; 170: similarity display control unit; 172: range designation reception unit; 174: in-range waveform selection unit; 180: model acquisition unit; 182: input waveform acquisition unit; 184: waveform input unit; 186: evaluation result output control unit; 190: management data; 202: abnormal waveform data; 204: pseudo abnormal waveform data; 206: pseudo abnormal waveform data; 212: histogram; 214: waveform; 220: display; 300: waveform data; 301: data size; 302: range; 303: start point; 304: end point; 305: section; 308: pseudo waveform data; 311: range; 312: waveform; 313: waveform; 314: waveform; 321: via-point; 322: spline curve; 400: display data; 412: graph; 414: histogram; 422: graph; 424: histogram; 432: graph; 434: histogram; 1200: computer; 1210: host controller; 1212: CPU; 1214: RAM; 1216: graphics controller; 1218: display device; 1220: input/output controller; 1222: communication interface; 1224: storage apparatus; 1230: ROM; and 1240: input/output chip.

The invention claimed is:

1. A generation system comprising one or more processors wherein:
   the one or more processors acquires waveform data;
   the one or more processors specifies, in accordance with an instruction of an user, a plurality of combinations of algorithms and parameter settings;
   the one or more processors generate a pseudo abnormal waveform data set including a plurality of pieces of pseudo abnormal waveform data from the waveform data by using the algorithm and the parameter setting for each of the specified plurality of combinations;
   the one or more processors perform control to display, to the user, display data indicating similarity between each of the plurality of pieces of pseudo abnormal waveform data included in the pseudo abnormal waveform data set and the waveform data which is a source of the generation of the pseudo abnormal waveform data set;
   the one or more processors receives designation of a range of the similarity with respect to the display data by the user who has browsed the display data;
   the one or more processors selects a selected plurality of pieces of pseudo abnormal waveform data from the plurality of pieces of pseudo abnormal waveform data that corresponds to the designated range of the similarity; and
   the one or more processors stores the selected plurality of pieces of pseudo abnormal waveform data as a selected pseudo abnormal waveform data set.

2. The generation system according to claim 1, wherein the one or more processors
   generate the pseudo abnormal waveform data set including the plurality of pieces of pseudo abnormal waveform data from the waveform data by using the algorithm, the parameter setting, and a random number.

3. The generation system according to claim 2, wherein:
   an interface receives the designation of the designated range of the similarity by the user with respect to the display data; and
   the one or more processors select the plurality of pieces of pseudo abnormal waveform data corresponding to the designated range of the similarity for which the designation is received by the interface; and
   the one or more processors store a pseudo abnormal waveform data set including the selected plurality of pieces of pseudo abnormal waveform data in a pseudo waveform storage unit.

4. The generation system according to claim 2, wherein the one or more processors perform control to display, to the user, other display data indicating similarity between each of the plurality of pieces of pseudo abnormal waveform data and other waveform data different from the waveform data.

5. The generation system according to claim 2, wherein:
   the one or more processors perform at least one of a plurality of types of preprocessing on the waveform data;
   the one or more processors associate the pseudo abnormal waveform data set including the plurality of pieces of pseudo abnormal waveform data generated from the waveform data subjected to the preprocessing with preprocessing identification information capable of identifying the preprocessing; and
   the one or more processors store the pseudo abnormal waveform data set in a pseudo waveform storage unit.

6. The generation system according to claim 1, wherein:
   the one or more processors associate each of a plurality of pseudo abnormal waveform data sets including the pseudo abnormal waveform data set with recipe information capable of identifying a combination of an algorithm of the algorithms and a parameter setting of the parameter settings used to generate the pseudo abnormal waveform data set; and
   the one or more processors store the plurality of pseudo abnormal waveform data sets in a pseudo abnormal waveform storage unit.

7. The generation system according to claim 1, wherein:
   the one or more processors associate each of a plurality of pseudo abnormal waveform data sets including the pseudo abnormal waveform data set with original waveform identification information capable of identifying the waveform data which is a source of generating the pseudo abnormal waveform data set; and
   the one or more processors store the plurality of pseudo abnormal waveform data sets in a pseudo waveform storage unit.

8. The generation system according to claim 1, wherein the one or more processors perform control to display, to the user, other display data indicating similarity between each of the plurality of pieces of pseudo abnormal waveform data and other waveform data different from the waveform data.

9. The generation system according to claim 1, wherein:
   the one or more processors perform at least one of a plurality of types of preprocessing on the waveform data;
   the one or more processors associate the pseudo abnormal waveform data set including the plurality of pieces of pseudo abnormal waveform data generated from the waveform data subjected to the preprocessing with preprocessing identification information capable of identifying the preprocessing; and the one or more processors store the pseudo abnormal waveform data set in a pseudo waveform storage unit.

10. The generation system according to claim 1, wherein:
the one or more processors perform at least one of a plurality of types of preprocessing on the waveform data;
the one or more processors execute machine learning using the pseudo abnormal waveform data set generated from the waveform data subjected to the preprocessing to generate a waveform evaluation model which outputs an evaluation result of input waveform data;
the one or more processors associate the waveform evaluation model with preprocessing identification information capable of identifying the preprocessing; and
the one or more processors store the waveform evaluation model in a waveform evaluation model storage unit.

11. The generation system according to claim 10, wherein:
the one or more processors acquire the waveform evaluation model associated with the preprocessing identification information stored in the waveform evaluation model storage unit;
the one or more processors perform preprocessing indicated by the preprocessing identification information on input waveform data and input a result to the waveform evaluation model; and
the one or more processors perform control to output an evaluation result of the input waveform data output from the waveform evaluation model.

12. The generation system according to claim 1, wherein:
the one or more processors associate the plurality of pieces of pseudo abnormal waveform data with pseudo identification information indicating that the plurality of pieces of pseudo abnormal waveform data is data generated from the waveform data and store the plurality of pieces of pseudo abnormal waveform data in a pseudo waveform storage unit;
the one or more processors execute machine learning using the plurality of pieces of pseudo abnormal waveform data to generate a waveform evaluation model which outputs an evaluation result of input waveform data; and
the one or more processors evaluate the waveform evaluation model without using the plurality of pieces of pseudo abnormal waveform data.

13. The generation system according to claim 1, wherein:
the one or more processors performs control to individually display pseudo abnormal waveform data selected by the user, among the plurality of pieces of the pseudo abnormal waveform data included in the abnormal waveform data set; and
the one or more processors receives the designation of the range of the similarity with respect to the display data by the user who has browsed the display data and the individually displayed pseudo abnormal waveform data.

14. A non-transitory computer-readable storage medium having stored thereon a program that causes a computer to operate as:
a waveform acquisition unit which acquires waveform data;
a specification unit which specifies, in accordance with an instruction of a user, a plurality of combinations of algorithms and parameter settings; and
a pseudo waveform generation unit which generates a pseudo abnormal waveform data set including a plurality of pieces of pseudo abnormal waveform data from the waveform data by using the algorithm and the parameter setting for each of the specified plurality of combinations;
a similarity display control unit which controls display, to the user, of display data indicating similarity between each of the plurality of pieces of pseudo abnormal waveform data included in the pseudo abnormal waveform data set and the waveform data which is a source of the generation of the pseudo abnormal waveform data set;
a range designation reception unit which receives designation of a range of the similarity with respect to the display data by the user who has browsed the display data;
an in-range waveform selection unit which selects a selected plurality of pieces of pseudo abnormal waveform data from the plurality of pieces of pseudo abnormal waveform data that corresponds to the designated range of the similarity; and
a waveform storage unit stores the selected plurality of pieces of pseudo abnormal waveform data as a selected pseudo abnormal waveform data set.

15. A method for generating a waveform evaluation model executed by a computer, comprising:
acquiring waveform data;
specifying, in accordance with an instruction of a user, a plurality of combinations of algorithms and parameter settings;
generating a pseudo abnormal waveform set including a plurality of pieces of pseudo abnormal waveform data from the waveform data by using the algorithm and the parameter setting for each of the specified plurality of combinations;
performing control to display, to the user, display data indicating similarity between each of the plurality of pieces of pseudo abnormal waveform data included in the pseudo abnormal waveform data set and the waveform data which is a source of the generation of the pseudo abnormal waveform data set;
receiving designation of a range of the similarity with respect to the display data by the user who has browsed the display data;
selecting a selected plurality of pieces of pseudo abnormal waveform data from the plurality of pieces of pseudo abnormal waveform data that corresponds to the designated range of the similarity; and
storing the selected plurality of pieces of pseudo abnormal waveform data as a selected pseudo abnormal waveform data set.

* * * * *